US008158930B2

(12) United States Patent
Grothe, Jr.

(10) Patent No.: US 8,158,930 B2
(45) Date of Patent: Apr. 17, 2012

(54) METHOD FOR SIMULTANEOUS CALIBRATION OF MASS SPECTRA AND IDENTIFICATION OF PEPTIDES IN PROTEOMIC ANALYSIS

(75) Inventor: Robert A. Grothe, Jr., Los Angeles, CA (US)

(73) Assignee: Cedars-Sinai Medical Center, Los Angeles, CA (US)

( * ) Notice: Subject to any disclaimer, the term of this patent is extended or adjusted under 35 U.S.C. 154(b) by 409 days.

(21) Appl. No.: 11/914,588

(22) PCT Filed: May 31, 2006

(86) PCT No.: PCT/US2006/021321

§ 371 (c)(1),
(2), (4) Date: Nov. 16, 2007

(87) PCT Pub. No.: WO2006/130787

PCT Pub. Date: Dec. 7, 2006

(65) Prior Publication Data

US 2008/0203284 A1 Aug. 28, 2008

Related U.S. Application Data

(60) Provisional application No. 60/686,684, filed on Jun. 2, 2005.

(51) Int. Cl.
*B01D 59/44* (2006.01)

(52) U.S. Cl. ......................... 250/282; 250/281; 250/291

(58) Field of Classification Search .................. 250/281, 250/282, 291; 702/85
See application file for complete search history.

(56) References Cited

U.S. PATENT DOCUMENTS 4,959,543 A 9/1990 McIver, Jr. et al.
7,348,553 B2 * 3/2008 Wang et al. .................. 250/282
7,493,225 B2 * 2/2009 Wang et al. .................. 702/85
7,577,538 B2 * 8/2009 Wang .................. 702/85
2002/0130259 A1 * 9/2002 Anderson et al. .................. 250/281
2004/0113063 A1 * 6/2004 Davis .................. 250/282
2005/0026198 A1 * 2/2005 Balac Sipes et al. .................. 435/6
2005/0029441 A1 * 2/2005 Davis .................. 250/281
2005/0086017 A1 * 4/2005 Wang .................. 702/85
2006/0169883 A1 * 8/2006 Wang et al. .................. 250/282
2006/0217911 A1 * 9/2006 Wang .................. 702/85

FOREIGN PATENT DOCUMENTS

WO 00/70649 A1 11/2000

OTHER PUBLICATIONS

Dempster, et al (J. Royal Statistical Society B, 39:1-38, 1977).*

(Continued)

*Primary Examiner* — Michael Maskell
(74) *Attorney, Agent, or Firm* — Seth D. Levy; Davis Wright Tremaine LLP

(57) ABSTRACT

The invention relates to a mass spectrometry calibration system that may be performed in real-time using the information contained within a sample without the addition of specific calibrants. When applied to a sample, such as a proteomic sample, the calibration system may identify the exact masses of peptides in the sample. The system involves the use of mathematical algorithms that iteratively estimate the error in the measurement and update the calibration parameters accordingly; thereby resulting in peptide mass identification.

29 Claims, 8 Drawing Sheets

OTHER PUBLICATIONS

Bruce, et al. "Obtaining more accurate Fourier transform ion cyclotron resonance mass measurements without internal standards using multiply charged ions," J. Am. Soc. Mass Spectrom., 2000, vol. 11, 416-421.
Cooper, et al. "Electrospray ionization Fourier transform mass spectrometric analysis of wine," J. Agric. Food Chem., 2001, vol. 49, 5710-5718.
Dempster, et al. "Maximum likelihood from incomplete data via the $EM$ algorithm," Journal of the Royal Statistical Society, Series B (Methodological), vol. 39, No. 1 (1977), pp. 1-38.
Gorshkov, et al. "Analysis and elimination of systematic errors originating from Coulomb mutual interaction and image charge in Fourier transform ion cyclotron resonance precise mass difference measurements," J. Am. Soc. Mass Spectrom., 1993, vol. 4, 855-868.
Marshall, et al. "Fourier transform ion cyclotron resonance mass spectrometry: A primer," Mass Spectrometry Reviews, 1998, vol. 17, 1-35.
Marshall, et al. "Petroleomics: The next grand challenge for chemical analysis," Acc. Chem. Res., 2004, vol. 37, 53-59.
Yanofsky, et al. "Multicomponent internal recalibration of an LC-FTICR-MS analysis employing a partially characterized complex peptide mixture: Systematic and random errors," Anal. Chem., 2005, vol. 7, 7246-7254.
Zhang, et al. "Accurate mass measurements by Fourier transform mass spectrometry," Mass Spectrometry Reviews, 2005, vol. 24, 286-309.
International Search Report dated Apr. 26, 2007 for International Application No. PCT/US06/21321, 1 page.
Supplementary European Search Report dated May 6, 2010 for European Application No. EP 06 77 1860, 5 pages.
Easterling, M.L. et al., "Routine Part-per-Million Mass Accuracy for High- Mass Ions: Space-Charge Effects in MALLDI FT-ICR", Anal. Chem., 1999, 71(3):624-632.
Hubbard, T. et al., "Ensembl 2005", Nucleic Acids Research, 2005, vol. 33, Database issue D447-D453.
Ledford, E.B. et al., "Space charge effects in fourier transform mass spectrometry. Mass calibration", Anal. Chem., 1984, 56:2744-2748.
Masseslon, C.et al., "Mass measurement errors caused by "local" frequency perturbations in FTICR mass spectrometry", Journal of the American Society for Mass Spectrometry. 2002,13:99-106.
Wool, A. et al., "Precalibration of matrix-assisted laser desorption/ionization-time of flight spectra for peptide mass fingerprinting", Proteomics, 2002, 2:1365-1373.

* cited by examiner

| | | |
|---|---|---|
| A | $C_{42}H_{60}N_{12}O_{13}$ | 1000.440280 |
| B | $C_{44}H_{64}N_{12}O_{13}S$ | 1000.443651 |
| C | $C_{40}H_{64}N_{12}O_{18}$ | 1000.446153 |
| D | $C_{41}H_{68}N_{12}O_{13}S_2$ | 1000.447022 |
| E | $C_{41}H_{60}N_{16}O_{14}$ | 1000.447491 |

Convert Frequencies to Masses by Estimating Calibrating Parameters

High Mass Region Inset
True masses lie on x-axis.
low-confidence ID (left | )
high-confidence ID (right | ):
no candidates in ± 1σ

METHOD FOR SIMULTANEOUS CALIBRATION OF MASS SPECTRA AND IDENTIFICATION OF PEPTIDES IN PROTEOMIC ANALYSIS

This application is the National Phase of International Application PCT/US06/21321, filed May 31, 2006, which designated the U.S. and that International Application was published under PCT Article 21 (2) in English. This application also includes a claim of priority under 35 U.S.C. §119(e) to U.S. provisional patent application No. 60/686,684, filed Jun. 2, 2005.

FIELD OF INVENTION

The invention relates to the calibration of mass spectra obtained in connection with proteomic analysis and to the identification of peptides in connection with the same.

BACKGROUND OF THE INVENTION

In conventional ion cyclotron resonance ("ICR") mass spectrometers, such as those typically used in connection with Fourier Transform Mass Spectrometry ("FTMS"), charged particles are directed into a magnetic field such that the mass to charge ratio (M/Z) of the particles can be measured. In one application of this technology, as described in U.S. Pat. No. 4,959,543, which is incorporated by reference herein in its entirety, charged particles are subjected to a high voltage pulse and caused to be accelerated to larger radii of gyration relative to the particles' natural radii of gyration. Once excited in this fashion, the charged particles move in circular orbits at frequencies given by the cyclotron equation, $\omega=B/(M/Z)$ (where B is the magnetic field strength and $\omega$ is the angular frequency). The excited cyclotron motions induce transient signals on a pair of parallel electrodes positioned inside the magnet; the transient signals are a measure of the cyclotron frequency of the particles. In fact, the transient signals are actually a composite of the cyclotron frequencies of all of the ions present in the magnet. By implementing certain Fourier transform mathematics (e.g., a Fast Fourier Transform, or "FFT," algorithm to extract the frequency and amplitude for each frequency component), these transient signals are converted into a frequency spectrum (i.e., frequency peaks corresponding to each ionic species in the instrument). In this first order model, measured frequencies are converted into M/Z through calibration values when the magnetic field strength (B) is known. There are a number of commercially available products that implement the FTMS technique; for example, Thermo, Bruker, and IonSpec all produce FTMS instruments that generally function in this manner.

As noted above, FTMS exploits the property that an ion of mass M and charge Z placed in a magnetic field of strength B undergoes orbital motion with angular frequency B/(M/Z). In a mass spectrometer, ions must be trapped by an external electrostatic field producing a slight shift in the cyclotron frequency given above. Additional frequency shifts are produced by the electrostatic field produced by the population of ions in the instrument, known as the "space-charge effect" (Gorshov. et al., *Amer. Society Mass Spectrom.* 4:855-868, 1991). Variations in the frequency observed for a particular ion (with fixed M/Z) can be due to fluctuations in the strength of the magnetic field, trapping voltage, or the "space-charge" effect. Of these three factors, the space-charge effect is believed to be the most difficult to control and to model. Variations in the space-charge effect are significant in liquid-chromatography mass spectrometry (LCMS), the standard technique used in analysis of proteomic samples. These variations are best corrected by active real-time calibration.

Efforts to extract accurate mass information from FTMS by mass calibration have been previously investigated. See L. K. Zhang et al., *Mass Spectrometry Reviews,* 24:286-309 (2005). Previous methods of FTMS mass calibration include the use of "internal" calibrants, and/or the use of "external" calibrants. In external, or "off-line" calibration, a set of standard molecules of known mass are measured by the instrument separately from the experimental sample. The differences between the measured and true masses are known with certainty, and the calibration parameters are adjusted to minimize these differences. The primary limitation of external calibration is that the calibration parameters do not remain constant from one scan to the next, largely due to the space charge effect. See E. B. Ledford, Jr. et al., *Anal. Chem.,* 56:2744-2748 (1984).

Internal or "on-line" calibration involves the infusion of standard molecules of known mass into an experimental sample, or directly into the mass spectrometer in parallel with the sample, and measuring the mass of the standards and experimental sample in the same scan. However, the signal from the calibrant molecules may obscure a signal arising from the sample through "ion suppression". Ion suppression occurs because the total ion capacity of an FTMS instrument is generally fixed. Therefore, the calibrant molecules are analyzed at the expense of analyte ions, reducing the measured analyte signal.

A number of methods have attempted to perform calibration without added calibrants in a process called "direct calibration". One approach (described in M. Mann, Proceedings of the 43$^{rd}$ ASMS Conference on Mass Spectrometry and Allied Topics, Atlanta, 1995) is based upon Mann's insight that peptide masses are confined to clusters of values spaced roughly 1 Dalton (10-100 ppm) apart throughout the spectrum (Wool et al., *Proteomics,* 2:1365-1373, 2002). While this method may be useful for low mass accuracy mass spectrometers (e.g., MALDI-TOF), it is not suitable for use with higher mass-accuracy systems such as FTMS. In these methods, peptides are either matched to a distribution (not identified) or only peptides that are known to be in the sample a priori are identified.

Another direct calibration method uses the known mass spacings between different charge states of the same molecule as calibration constraints (Bruce et al., *JASMS* 11:416-421, 2000). However, this method is unable to match the accuracy of FTMS frequency measurements. Yanofsky et al. disclose a method for an internal recalibration of an FTICR-MS analysis (*Anal. Chem* 77:7246-7254, 2005). However, this method is a limited approach that uses the knowledge of a particular class of proteins, and requires partial knowledge of the sample components. Direct calibration methods have also been used to identify components in wine (Cooper, H. J., and Marshall, A. G., *J. Agric. Food Chem,* 49:5710-5718), and petroleum products (Marshall A. G. et al., *Acc. Chem. Res.* 37:53-59, 2004). These methods, however, also require a priori knowledge of the masses of some of the species in the sample.

There is a need in the art for improved calibration and peptide identification techniques in connection with mass spectrometry that obviate at least some of the aforementioned limitations of currently available technology.

SUMMARY OF THE INVENTION

The invention disclosed herein relates to systems and methods useful for producing calibrated mass spectrometry spectra using components of a mass spectrometry sample as calibrants.

Embodiments of the present relate to methods of producing a calibrated mass spectrum, comprising: providing a sample comprising an elemental composition, subjecting the sample to mass spectrometry whereby a mass spectrometry output is obtained, providing input parameters, converting the mass spectrometry output to mass values using the input parameters, estimating error and elemental composition probabilities based on the mass values, updating the input parameters based on the estimated error and elemental composition probabilities, applying the updated input parameters to the mass spectrometry output to produce updated mass values, and repeating several of these steps until convergence is reached, whereby a calibrated mass spectrum is produced.

Further embodiments of the present invention relate to methods wherein the input parameters are selected from the group consisting of a mass database, initial calibration parameters, an initial error estimate, updated calibration parameters, an updated error estimate, and combinations thereof.

Still further embodiments of the present invention relate to methods wherein the mass spectrometry is Fourier transform mass spectrometry.

Other embodiments of the present invention relate to methods wherein the mass spectrometry output comprises cyclotron frequencies, and wherein the elemental composition probabilities are peptide probabilities.

Additional embodiments of the present invention relate to methods wherein the sample is selected from the group consisting of blood, plasma, serum, spinal fluid, urine, sweat, saliva, tears, breast aspirate, prostate fluid, seminal fluid, vaginal fluid, stool, cervical scraping, cytes, amniotic fluid, intraocular fluid, mucous, moisture in breath, animal tissue, cell lysates, tumor tissue, hair, skin, buccal scrapings, nails, bone marrow, cartilage, prions, bone powder, ear wax, and combinations thereof.

Alternative embodiments of the present invention relate to methods wherein the elemental composition comprises at least one peptide.

Other embodiments of the present invention relate to methods wherein the sample is selected from the group consisting of hydrocarbons, petroleum products, nucleotides, combinatorial samples, polymeric samples, and combinations thereof.

Other embodiments of the present invention relate to methods wherein the sample is a petroleum product.

Other embodiments of the present invention relate to methods wherein the estimating the error and elemental composition probabilities comprises using an Expectation Minimization algorithm and/or using a spline algorithm.

Embodiments of the present invention relate to mass spectrometry calibration systems, comprising a mass spectrometry device to analyze a sample and produce a mass spectrometry output, and calibration software configured to receive input parameters, convert the mass spectrometry output to mass values using the input parameters, estimate error and elemental composition probabilities based on the mass values, update input parameters based on the estimated error and elemental composition probabilities, apply the updated input parameters to the mass spectrometry output to produce updated mass values, and repeat several of these steps until convergence is reached, whereby a calibrated mass spectrum is produced.

Further embodiments of the present invention relate to mass spectrometry calibration systems wherein the input parameters are selected from the group consisting of a mass database, initial calibration parameters, an initial error estimate, updated calibration parameters, an updated error estimate, and combinations thereof.

Still further embodiments of the present invention relate to mass spectrometry calibration systems wherein the mass spectrometry device is a Fourier transform mass spectrometer.

Other embodiments of the present invention relate to mass spectrometry calibration systems wherein the mass spectrometry output comprises cyclotron frequencies, and wherein the elemental composition probabilities are peptide probabilities.

Further embodiments of the present invention relate to mass spectrometry calibration systems wherein the sample is selected from the group consisting of blood, plasma, serum, spinal fluid, urine, sweat, saliva, tears, breast aspirate, prostate fluid, seminal fluid, vaginal fluid, stool, cervical scraping, cytes, amniotic fluid, intraocular fluid, mucous, moisture in breath, animal tissue, cell lysates, tumor tissue, hair, skin, buccal scrapings, nails, bone marrow, cartilage, prions, bone powder, ear wax, and combinations thereof.

Still further embodiments of the present invention relate to mass spectrometry calibration systems wherein the sample comprises at least one peptide.

Additional embodiments of the present invention relate to mass spectrometry calibration systems wherein the sample is selected from the group consisting of hydrocarbons, petroleum products, nucleotides, combinatorial samples, polymeric samples, and combinations thereof.

Other embodiments of the present invention relate to mass spectrometry calibration systems wherein the sample is a petroleum product.

Further embodiments of the present invention relate to mass spectrometry calibration systems wherein the software is configured to estimate the error and the elemental composition probabilities using an Expectation Minimization algorithm, and/or using a spline algorithm.

Embodiments of the present invention also relate to a computer-readable medium having computer-executable instructions that when executed perform a method, the method comprising converting a mass spectrometry output to mass values using input parameters, estimating error and elemental composition probabilities based on the mass values, updating the input parameters based on the estimated error and elemental composition probabilities, applying the updated input parameters to the mass spectrometry output to produce updated mass values, and repeating several of these steps until convergence is reached, whereby a calibrated mass spectrum is produced.

Further embodiments of the present invention relate to computer-readable media wherein the input parameters are selected from the group consisting of a mass database, initial calibration parameters, an initial error estimate, and combinations thereof.

Still further embodiments of the present invention relate to computer-readable media wherein the estimating the error and the elemental composition probabilities uses an Expectation Minimization algorithm and/or a spline algorithm.

Other embodiments of the present invention relate to computer-readable media wherein the mass spectrometry output is produced by a Fourier transform mass spectrometer.

Additional embodiments of the present invention relate to computer-readable media wherein the mass spectrometry output comprises cyclotron frequencies.

Further embodiments of the present invention relate to computer-readable media wherein the elemental composition probabilities are peptide probabilities.

DESCRIPTION OF THE INVENTION

Unless defined otherwise, technical and scientific terms used herein have the same meaning as commonly understood by one of ordinary skill in the art to which this invention belongs. One skilled in the art will recognize many methods and materials similar or equivalent to those described herein, which could be used in the practice of the present invention. Indeed, the present invention is in no way limited to the methods and materials described.

Embodiments of the present invention relate to systems and methods for calibration and peptide identification in connection with mass spectrometry; in particular, with FTMS. Furthermore, the present invention exploits the natural relationship between peptide identification and calibration to solve two related problems simultaneously, and to iteratively improve the solutions for each. Most conventional calibration methods require calibrant molecules of known mass to be added to a sample. The present invention, however, is based upon an iterative process of identifying components in the sample and using these identified components as calibrants.

While preferred embodiments of the inventive systems and methods relate to peptide calibration, they may readily be applied to other types of chemicals or compounds. As used herein, the general term "elemental composition" includes all types of compounds, including peptides, that may be analyzed using the systems and methods disclosed herein.

Most calibration methods in current use require the addition of calibrant molecules of known mass into a sample. Alternatively, the inventive direct calibration methods use the components of the sample alone to provide dozens of calibrants covering the entire mass spectrum. Direct calibration methods save time and materials, simplify the experimental apparatus and protocol, perform calibration in real time each time a spectrum is generated, avoid obscuration of information that can result from ion suppression, resulting in significant improvements in accuracy. The higher mass accuracy of FTMS systems allow the identification of elemental compositions from a large pool of candidates, for example, human tryptic peptides or petroleum components. Increased calibration accuracy results from the ability to use more species in the calibration and the positive feedback between identification and calibration.

Figure 1:
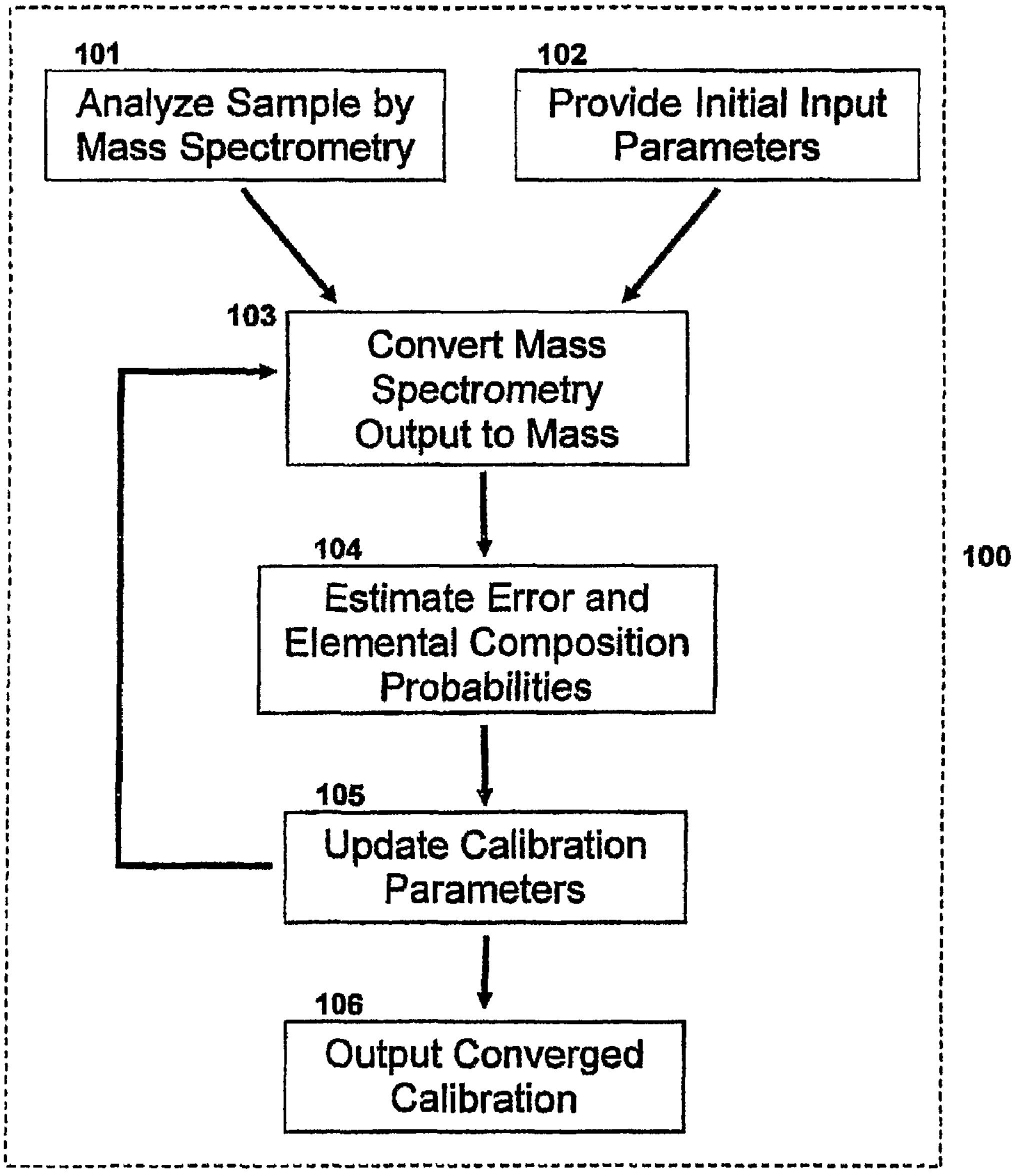
FIG. 1 depicts a flow chart, illustrating a method of simultaneous calibration of mass spectra and elemental composition identification in accordance with an embodiment of the present invention.

FIG. 1 shows a general overview of the calibration system (100). First, a sample may be analyzed by mass spectrometry to produce a mass spectrometry output (101). For example, with FTMS, the mass spectrometry output comprises cyclotron frequencies. The mass spectrometry output, along with other initial input parameters (102), such as a mass database (ENSEMBL, for example), calibration parameters, and error estimates may be used to convert the mass spectrometry output to mass values (103). The error as well as the probabilities for the elemental compositions may then be estimated (104), and the calibration parameters may be updated (105). The updated calibration parameters may then be used to again convert mass spectrometry output to mass values. Steps 103 through 105 may repeated any number of times until the data reach convergence. The converged data, or converged calibration output, may then be stored or displayed in any suitable computer-readable or printed format (106). In certain embodiments of the invention, the output of the mass spectrometry calibration system is a calibrated mass spectrum.

Figure 2A:
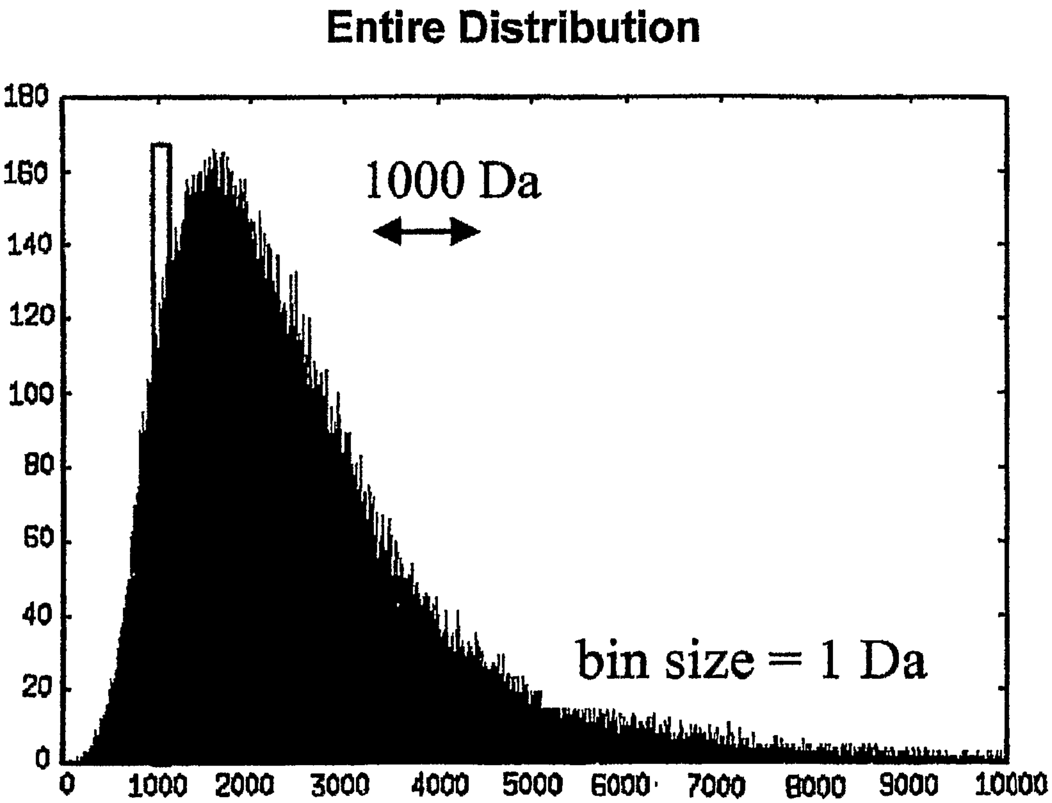
FIG. 2A shows a distribution of peptide masses in the human proteome in accordance with an embodiment of the present invention.
Figure 2B:
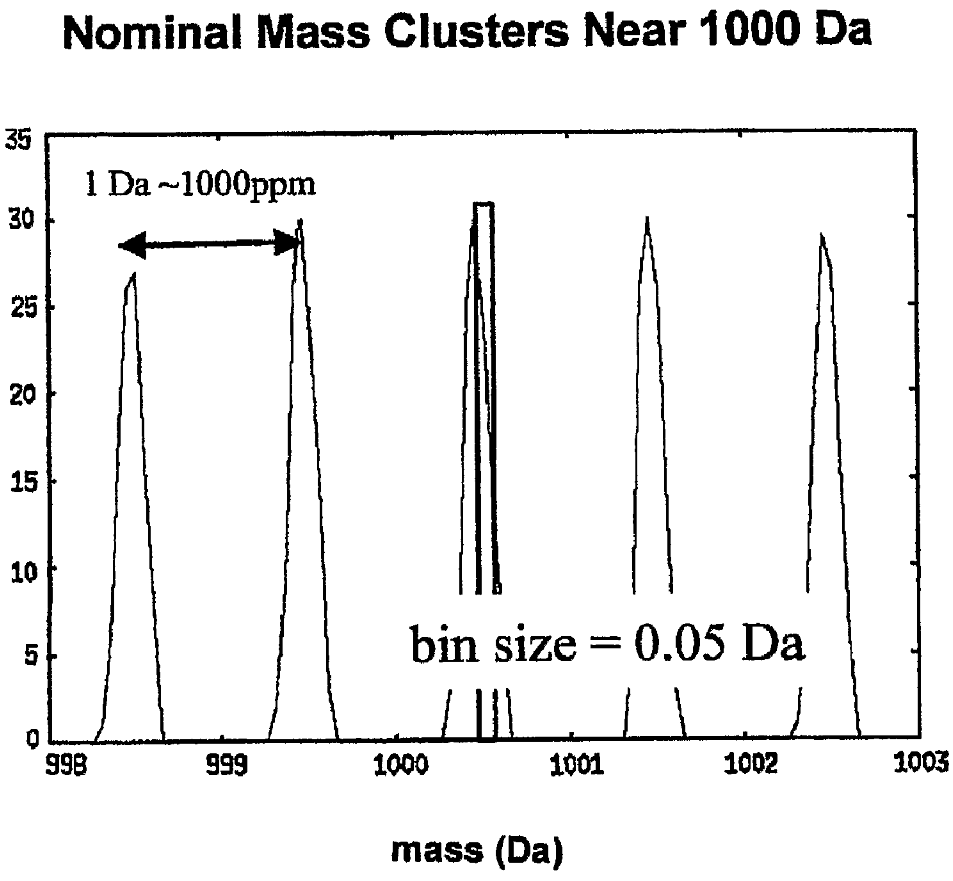
FIG. 2B is an inset of FIG. 2A in accordance with an embodiment of the present invention. It shows nominal mass clusters near 1,000 Da.
Figure 2C:
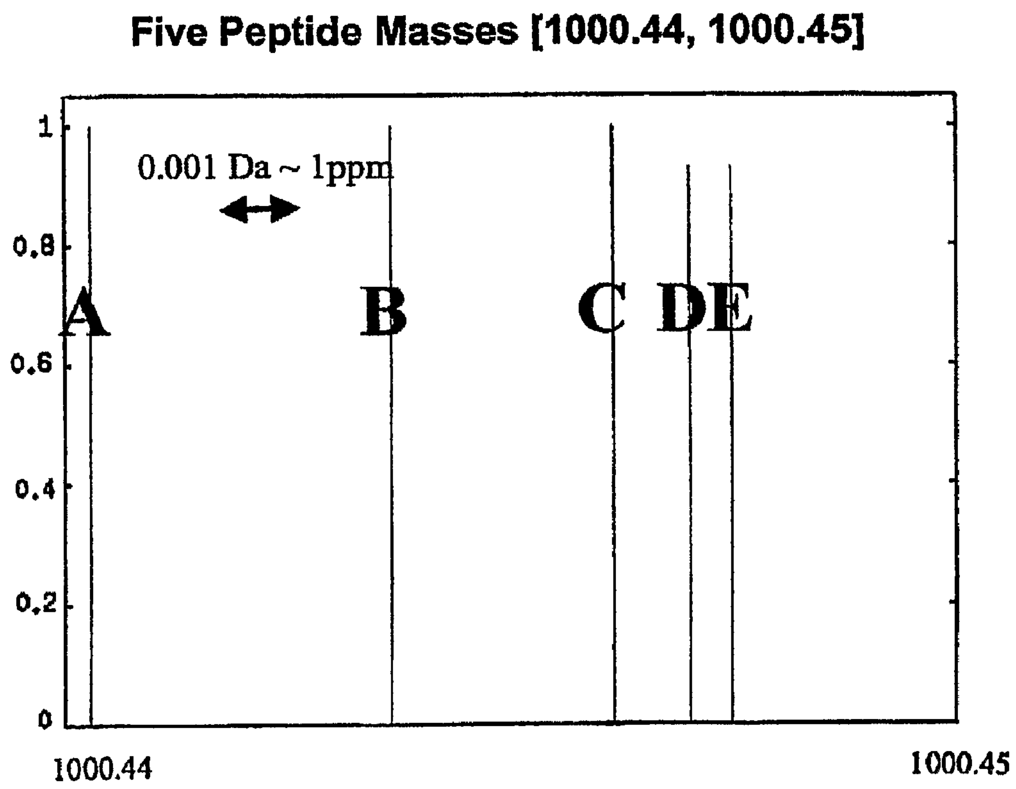
FIG. 2C is an inset of FIG. 2B in accordance with an embodiment of the present invention. The panel shows five individual peptide masses designated by the peak numbers A through E.

In accordance with an embodiment of the present invention, calibration may be performed in real-time using the information contained in a sample without the addition of specific calibrants. A sample comprising peptides, for example, a proteomic sample, may be subjected to a mass spectrometry, for example, FTMS, using instruments and methods that are well known in the art. As shown in FIGS. 2A through 2C, Individual human tryptic peptide masses may be resolved at around 1 ppm accuracy. Table 1 shows for example, the number of peptide mass values that may be analyzed. FIG. 2A shows the entire distribution of mass values in the human proteome. FIG. 2B is an inset of the region of FIG. 2A (inset region designated by the rectangular bar). This figure shows the nominal mass clusters near 1000 Da. FIG. 2C is an inset of the region of FIG. 2B (inset region designated by the rectangular bar). This figure shows five individual peptide masses. The box below the graph designates the mass for peaks A through E in the figure.

TABLE 1

| | |
|---|---|
| human protein sequences (as provided by IPI, ENSEMBL) | 50,071 |
| ideal tryptic peptides | 2,515,788 |
| distinct sequences | 808,076 |
| distinct masses | 356,933 |

In FTMS, an ionized peptide's mass-to-charge ratio is estimated by estimating the frequency of its circular motion induced by a centripetal magnetic force. The ion induces an image charge, or transient voltage signal, on either of two parallel detection plates as it passes. The observed frequency is calculated from a peak in the Fourier transform of the transient voltage between the plates.

Figure 3A:
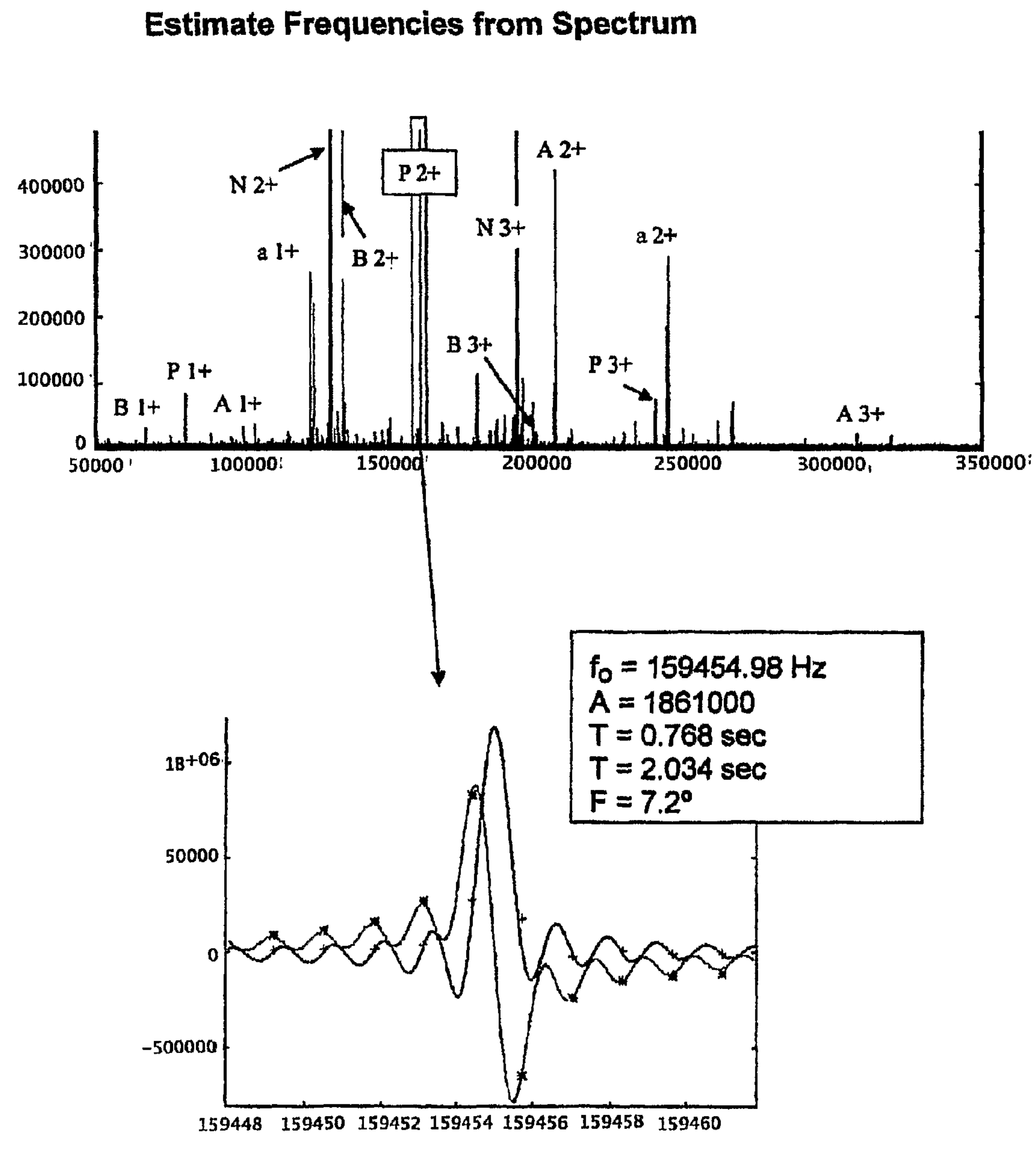
FIG. 3A shows the estimation of frequencies from a mass spectrum in accordance with an embodiment of the present invention.
Figure 3B:
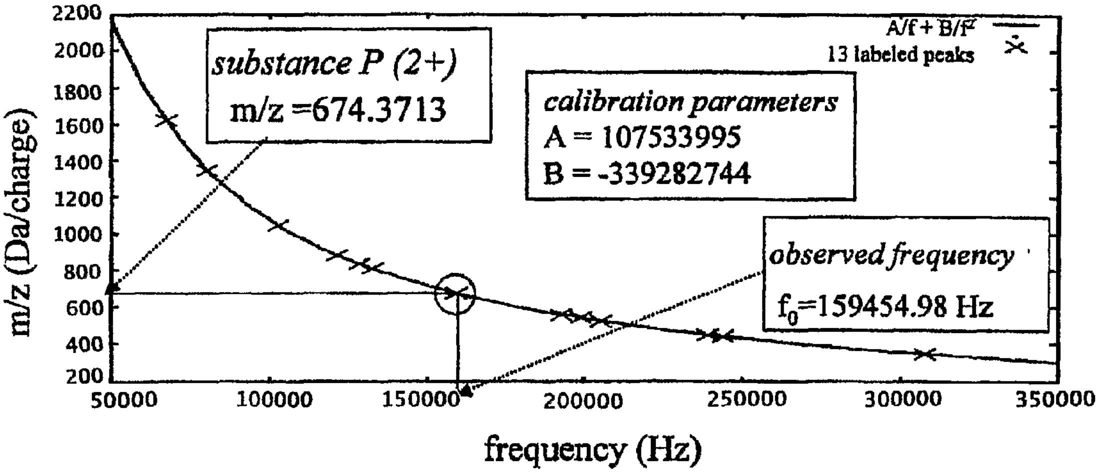
FIG. 3B shows a graph depicting the conversion of frequencies to masses by estimating calibration parameters in accordance with an embodiment of the present invention.

The "observed" mass is derived in a two-step process; 1) extraction of ion frequencies, and 2) conversion of frequencies to mass by calibration. As shown in FIG. 3, calibration of the FT mass spectrometer is the process by which each observed frequency (a peak in a spectrum) is converted into a mass-to-charge value. In FTMS, the measured quantity is frequency, and mass "measurements" are derived from frequencies. Calibration may be thought of as an optimization problem: given a family of calibration equations such that there is a one-to-one correspondence with vectors of real-valued parameters, choose an equation (or equivalently parameter values) that minimizes a cost function. In this case, the cost function is the estimated variance of the normalized error.

Figure 4:
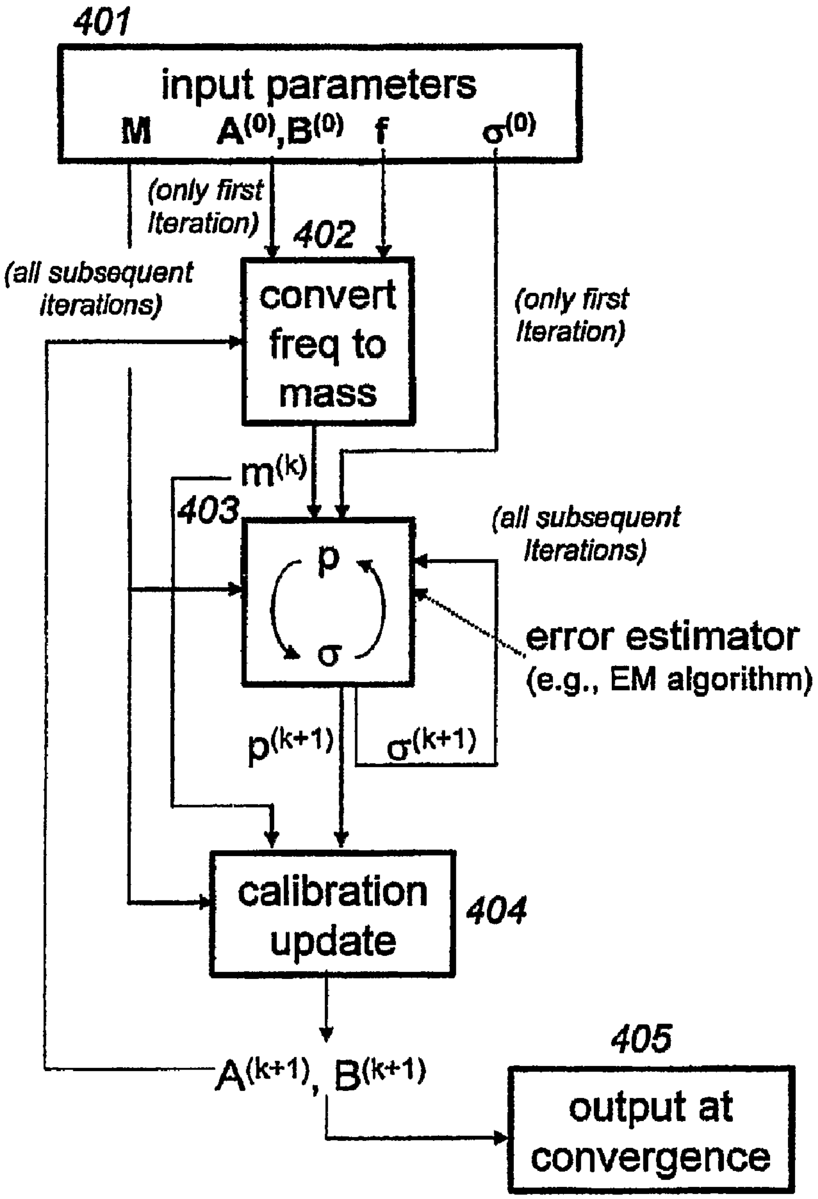
FIG. 4 shows a more detailed overview of the calibration process in accordance with an embodiment of the present invention.

FIG. 4 shows the calibration process for FTMS in more detail. Table 2 shows the definitions of the symbols used in FIG. 4. Box 401 comprises the input parameters. The input parameters include M, which denotes a peptide mass database, $A^{(0)}$ and $B^{(0)}$ the initial calibration parameters, f, the observed frequencies from the mass spectrometer, and $\sigma^{(0)}$, the initial error estimate. $A^{(0)}$, $B^{(0)}$, and $\sigma^{(0)}$ are only used in the first iteration. The values $A^{(0)}$ and $B^{(0)}$ are used to convert the observed frequencies to mass values (402). The value $\sigma^{(0)}$ is used to calculate initial peptide mass distributions.

TABLE 2

| Symbol | Definition |
|---|---|
| $f = (f_1 \ldots f_n)$ | observed frequencies |
| $M = (M_1 \ldots M_N)$ | peptide mass database |
| $A^{(k)}, B^{(k)}$ | calibration parameters |
| $\sigma^{(k)}$ | error estimate |
| $m^{(k)} = (m_1^{(k)} \ldots m_n^{(k)})$ | calibrated mass |
| $p^{(k)} = [p_{ij}^{(k)}]_{i=[1 \ldots n], j=[1 \ldots N]}$ | probability matrix |
| $p_{ij}$ | probability that frequency I (came from mass $M_i$) |

The mass values are then subjected to an iterative process wherein a mathematical algorithm, such as the Expectation Maximization (EM) algorithm is applied, allowing for the estimation of error in the probabilities that are assigned to the mass values (403). A comprehensive description of the EM algorithm is provided in a publication by Dempster et al. (*J. Royal Statistical Society B,* 39:1-38, 1977), which is incorporated herein by reference in its entirety. The use of the EM algorithm for calibration is described in the Examples. The revised error estimates allow for the calculation of updated calibration parameters (404), A($^k$) and B($^k$). These calibration parameters are then re-applied to the mass values. The processes designated by boxes 402 through 404 are repeated until the updated calibration parameters no longer change from the values in the subsequent iterations. This stage is referred to as "convergence" (405).

In general, the frequency is inserted into a calibration equation to obtain the mass-to-charge ratio of the ionized peptide. The calibration equation has a set of parameters whose values are taken to be fixed in the initial step of the calculation. Subsequently, the calibration parameters are tuned to minimize the estimated normalized error.

The second step is to estimate the charge on the peptide by examining the positions of adjacent peaks that are presumed to be species with identical elemental composition and charge, differing only in isotopic composition. Since these mass differences between isotopes are approximately one atomic mass unit, a peptide with charge z would produce a set of peaks with uniform peaks separated by 1/z units in mass-to-charge.

To first order, the mass-to-charge ratio is linearly proportional to the period of the ion's revolution; the constant of proportionality is the magnitude of the magnetic field. The very high accuracy of the FTMS, however, exposes systematic errors in the simple first-order model. Higher-order effects depend upon the geometry of the analytic chamber and the "space-charge effect"—interactions between multiple ionic species present within the chamber. A term that depends upon the square of the period is commonly used to account for these effects. A review by Zhang et al. describes some of the development of these models (*Mass Spectrometry Reviews* 24:286-309, 2005).

For example, a collection of peptide mass measurements and a database of exact peptide mass values may be provided. There are several databases comprising exact peptide mass values that are known in the art. For example, the ENSEMBL database (Hubbard T. et al., Nucleic Acids Res 33:D447-D453, 2005) and the European Bioinformatics Institute (EBI) both provide comprehensive lists of peptides and peptide masses. Alternatively, the calculated masses of an "in silico" tryptic digest of a proteome, for example, the human proteome, may be used as a peptide mass database. For elemental compositions other than peptides, such as petroleum products, polymers, or combinatorial libraries, alternative mass databases may be used that are apparent to those of skill in the art.

The calibration process proceeds iteratively. At each step, the calibration parameters are updated to minimize the variance of the normalized error using the current estimate of the probability mass distribution for the exact mass identity (elemental composition, e.g., peptide). The updated calibration parameters change the mass values that are computed from the observed frequencies. These new values will result in a new (initial) estimate for the normalized error variance. This initial estimate will be refined by the EM algorithm, resulting in a updated estimate of the normalized error variance and a new set of probability mass distributions for the exact mass identity of each measurement. This procedure of iterating calibration steps and applications of the EM algorithm to update the exact mass probabilities is repeated to convergence. The term "convergence," as used herein occurs when subsequent iterations result in essentially the same values of the calibration parameters A and B. An example of this process is shown in Example 4.

The calibration system disclosed herein may be used with a number of different mass spectrometry systems and configurations that are known in the art. While an embodiment involves the use of the calibration system with FTMS, it may also be used with other types of mass spectrometry such as time-of-flight (TOF) mass spectrometry, given that the mass accuracy is sufficient.

The calibration system disclosed herein may be used on a variety of different sample types. In a preferred embodiment, the calibration system is used with samples comprising peptides in a biological sample. For example, a proteomic sample may be analyzed. A wide array of biological samples may be obtained and used in conjunction with alternate embodiments of the system (e.g., a body fluid, such as blood, plasma, serum, CSF (spinal fluid), urine, sweat, saliva, tears, breast aspirate, prostate fluid, seminal fluid, vaginal fluid, stool, cervical scraping, cytes, amniotic fluid, intraocular fluid, mucous, moisture in breath, animal tissue, cell lysates, tumor tissue, hair, skin, buccal scrapings, nails, bone marrow, cartilage, prions, bone powder, ear wax, etc.). In addition, non-mammalian biological samples may be analyzed using the systems and methods disclosed herein. For example, samples of elemental compositions obtained from plants, bacteria, fungi, soil, and water may be analyzed.

In addition to biological samples comprising peptides, the calibration systems and methods disclosed herein may be used to analyze any number of different types of samples that will be readily apparent to those of skill in the art. Other examples of chemical compounds or elemental compositions that may be analyzed in this manner include but are by no means limited to polynucleotides, hydrocarbon or petroleum products, combinatorial libraries, and polymeric samples. Further, the calibration system may also be used to analyze the compounds or elemental compositions present in liquids such wine or other beverages. The calibration method requires that most components belong to a finite, but large set of possible elemental compositions. The size of this set can be as large as $10^5$-$10^6$, and is limited only by the accuracy of the MS instrument.

For peptide applications of the calibration system, samples may be prepared using any suitable method. Many such methods are known in the art. For example, a proteomic sample may be digested with a protease such as trypsin to produce smaller peptides. Prior to introduction into the mass spectrometer, the peptides may be fractionated by a variety of methods, including chromatographic methods such as reverse-phase, size exclusion, or ion exchange chromatography, or by electrophoretic methods such as SDS-PAGE.

The mass spectrometry calibration system disclosed herein generally comprises "calibration software" that facilitates the mathematical calculations necessary for calibration. The calibration software may be stored as machine readable code on a computer that may be in communication with the mass spectrometry system. Alternatively, the calibration system may be applied to the output of a mass spectrometer separately from the mass spectrometry system. The software may be stored on any suitable computational device. For example, the software as well as the means for its execution may be integrated with the mass spectrometry instrument, or housed separately on a computer or any type of suitable electronic storage device. Examples include but are no means limited to hard disks or drives, CD-ROMs, DVDs, and removable storage devices such as USB drives and flash drives. Nearly any hardware, firmware, software, operating system, database platform, networking technique or other conventional computer tool can be configured to operate in connection with the system and methods of the present invention, as will be appreciated by those of skill in the art.

In an alternative embodiment of the invention, an algorithm is utilized that finds a spline curve (continuous in first derivative) that minimizes the weighted squared distance to identified masses. The use of spline in a high-order, locally deformable calibration model to fit a large number of calibrants is believed to be one of the novel features of the instant invention. The spline may be constructed from segments of the form $M/Z=A/f+B/f^2+C$. The weight associated with each calibrant point reflects the probability that a given mass has been identified correctly. Each spline segment may contain at least N points (e.g., N=10, N=20, etc.) to prevent overfitting. Indeed, generally speaking, the estimation of calibration (spline) parameters is the solution to a constrained optimization problem. The solution is the point where the vector normal to the constraint space (sets of parameters which are valid splines—i.e., smooth curves) is parallel to the gradient of the objective function (i.e., the sum of squared differences between observed and calculated mass values). Example 6 demonstrates how a spline algorithm may be used in the calibration process.

EXAMPLE 1

Assessment of a Peptide's Exact Mass from a Mass Measurement with Known Error In this Example, the mass of a peptide is measured, and the measured mass is denoted as β. To make an inference about the true mass of the peptide from the measured value, a quantitative model of the measurement process is needed. The measurement of a peptide with mass a can be modeled as the sum of the true mass α plus an error term, e.

The error term, denoted by "e", is a normally distributed random variable with mean zero and variance $\sigma^2$. The conditional probability density, $p(\beta|\alpha)$, evaluated at β is given below.

$$p(\beta\mid\alpha)=(2\pi\sigma^2)^{-1/2}\exp\left(\frac{-(\beta-\alpha)^2}{2\sigma^2}\right) \tag{1}$$

For the purposes of this example, a database of all possible exact mass values may be provided, and the set of these values may be denoted by $\{\alpha_1, \alpha_2 \ldots \alpha_r\}$. Peptide exact mass assessment involves assigning probabilities to the possible mass values, $p(\alpha_j|\beta)$, j [1 . . . r], given the measured value β. These probabilities may be computed in terms of our measurement model and Bayes' Law.

$$p(\alpha_j\mid\beta)=\frac{p(\alpha_j)p(\beta\mid\alpha_j)}{\sum_{j=1}^{r}p(\alpha_j)p(\beta\mid\alpha_j)} \tag{2}$$

The factor $p(\alpha_\Phi)$ in the above equation denotes the a priori (before measurement) probability that the peptide has mass $\alpha_j$. If there is no a priori information about the peptide mass values, $p(\alpha_j)=1/r$, for all j in [1 . . . r]. For example, it is possible to assign theoretical a priori probabilities to peptide elemental compositions.

Although the above equation assigns non-zero probability to all possible mass values, the probability assigned to values differing from β by more than 5σ is quite small and can be neglected. In some cases, only one exact mass value will have significant probability.

EXAMPLE 2

Estimation of Mass Measurement Error Variance from Measurements of Known Peptides A related calculation is the estimation of the variance of the mass measurement error e from a collection of measurements of peptides of known masses. For example, in this case, one may have q peptides with masses $\alpha_{m(1)}, \alpha_{m(2)}, \ldots \alpha_{m(q)}$ respectively. Each peptide in sequence may be measured resulting in measured values $\beta_1, \beta_2, \ldots \beta_q$ respectively. That is, for each i from 1 to q, $\beta_i$ is the measured value of the ith peptide, whose true mass is $\alpha_{m(i)}$.

If it is known that when measurement errors are independent and identically distributed normal random variables with mean zero, the maximum likelihood estimate of the variance of the error may be computed. Let $\sigma^2$ denote the (unknown) variance of the error. The probability density for the measured value of a peptide with mass $\alpha_{m(i)}$, evaluated at the value $\beta_1$ is given by Equation 1.

Let N-component vectors α and β denote the ordered collections of true and measured masses respectively. Then the probability density for the entire set of measured values, evaluated at b, is given by Equation 3

$$p(\beta\mid\alpha,\sigma^2)=(2\pi\sigma^2)^{-q/2}\prod_{i=1}^{q}\exp\left(\frac{-(\beta_i-\alpha_{m(i)})^2}{2\sigma^2}\right)=(2\pi\sigma^2)^{-q/2}\exp\left(\frac{-\|\beta-\alpha\|^2}{2\sigma^2}\right) \tag{3}$$

where $\|\beta-\alpha\|^2$ denotes the squared Euclidean distance between β and α, that is, the sum of the squared component differences.

Let $\hat{\sigma}^2$ denote the maximum-likelihood estimate of the error variance, the value of $\sigma^2$ that maximizes the right-hand side of Equation 3. It is equivalent and more convenient, to maximize the logarithm of this quantity. First, the first-derivative is evaluated with respect to $\sigma^2$.

$$\frac{d}{d\sigma^2}\log p(\beta \mid \alpha, \sigma^2) = \frac{d}{d\sigma^2}\log\left(-\frac{q}{2}\log(2\pi\sigma^2) - \frac{-\|\beta-\alpha\|^2}{2\sigma^2}\right) = -\frac{q}{2\sigma^2} + \frac{-\|\beta-\alpha\|^2}{2(\sigma^2)^2} \tag{4}$$

The log-likelihood has zero first-derivative at $\hat{\sigma}^2$, and its value is determined as shown in Equation 5.

$$\frac{d}{d\sigma^2}\log p(\beta \mid \alpha, \sigma^2)\Big|_{\sigma^2=\hat{\sigma}^2} = 0 \qquad \hat{\sigma}^2 = \frac{\|\beta-\alpha\|^2}{q} = \frac{1}{q}\sum_{i=1}^{q}(\beta_i - \alpha_{m(i)})^2 \tag{5}$$

The maximum-likelihood estimate of the variance is simply the mean of the squared difference between measured and true values.

In mass spectrometry, the average magnitude of the error, for repeated measurements of the same peptide, is linearly proportional to the mass of the measured peptide. Furthermore, the measurement accuracy of a mass spectrometry is characterized by the average magnitude of the error expressed in parts per million (ppm) of the measured mass. For example, a peptide of mass $\alpha$ is measured and the resulting measurement error is e. That is, the measured value is $\alpha$+e. Let e' denote the normalized measurement error (expressed in ppm) defined by Equation 6.

$$e' = 10^6\frac{e}{\alpha} \tag{6}$$

Let $(\sigma')^2$ denote the variance of the normalized error. Let $(\hat{\sigma}')^2$ denote the maximum-likelihood estimate of this quantity. The estimation of the normalized error variance is similar to that of the unnormalized error variance and given by Equation 7.

$$(\hat{\sigma}')^2 = \frac{1}{q}\sum_{i=1}^{q}\left(\frac{\beta_i - \alpha_{m(i)}}{10^{-6}\alpha_{m(i)}}\right)^2 \tag{7}$$

EXAMPLE 3

Estimation of Measurement Error from Measurements of Unidentified Peptides

In the previous two examples, it was demonstrated 1) how to assess a peptide's exact mass from a mass measurement when the measurement error is known and 2) how to estimate the measurement error from a collection of known peptides. In this Example, the maximum likelihood estimate of the normalized measurement error variance from measurements of unidentified peptides will be derived. This solution will be interpreted in terms of the solutions of the problems in Examples 1 and 2.

In this Example, one has a database of all possible exact mass values denoted by a=($\alpha_1$, $\alpha_2$, . . . $\alpha_r$) and a collection of mutually independently measured peptide masses b=($\beta_1$, $\beta_2$, . . . $\beta_q$). There exists a mapping m: [1 . . . q]→[1 . . . r] such that for each i in [1 . . . q], measured value $\beta_i$ resulted from measuring a peptide with mass $\alpha_{m(i)}$. If this mapping were known, it would be possible to estimate the normalized error variance directly as described in the Example 2. In this sense, the quantities {$\alpha$, $\beta$, m} form a complete data set. Let $(\hat{\sigma}')^2|\alpha, \beta$,m denote the estimate of $(\sigma')^2$ given $\alpha$, $\beta$, and m. Instead the mapping m may be inferred (or better, averaged over possible realizations of m) to estimate $(\sigma')^2$ for the incomplete data set {$\alpha$, $\beta$}.

One possible method for constructing this estimate would be to start with an initial (incorrect) estimate of $(\sigma')^2$. Let $\lfloor(\hat{\sigma}')^2\rfloor_0$ denote this initial estimate. Then, assuming that the error parameter is actually $\lfloor(\hat{\sigma}')^2\rfloor_0$, for each measurement $\beta_i$, calculate the probability that the exact mass value is aj. These probabilities $p(\alpha_j|\beta_i, \lfloor(\hat{\sigma}')^2\rfloor_0)$ are computed substituting $\beta_i$ for $\beta$ in Equation 2 and $(10^6\alpha_j)^2\lfloor(\hat{\sigma}')^2\rfloor_0$ for $\sigma^2$ in Equation 1.

Then, the updated estimate of the measurement error is the weighted average over each pair of measurements and possible exact mass value ($\beta_i$, $\alpha_j$). The weights are the probabilities $p(\alpha_j|\beta_i,\lfloor(\hat{\sigma}')^2\rfloor_0)$ computed above. In general, if $(\hat{\sigma}')_n^2$ denotes the estimated variance after n iterations, the subsequent estimate $(\hat{\sigma}')_{n+1}^2$ is given by Equation 8.

$$[(\hat{\sigma}')^2]_{n+1} = \frac{1}{q}\sum_{i=1}^{q}\sum_{j=1}^{r}\left(\frac{\beta_i - \alpha_j}{10^{-6}\alpha_j}\right)^2 p(\alpha_j \mid \beta_i, [(\hat{\sigma}')^2]_n) \tag{8}$$

Like Equation 7, Equation 8 is the average of the observed deviations between the measured and exact mass. In Equation 8, each possible exact mass value is weighted by its conditional probability given the measured value $\beta_i$ and the previous estimate of the normalized error variance, $\lfloor(\hat{\sigma}')^2\rfloor_n$. These probabilities are computed as shown in Equation 2. Equation 8 reduces to Equation 7 if $p(\alpha_j|\beta_i, \lfloor(\hat{\sigma}')^2\rfloor_n)$ is set equal to $\delta_{ij}$, i.e. with probability one, the exact mass corresponding to measurement $\beta_i$ is $\alpha_i$.

The formal derivation of Equation 8 using the EM algorithm is given in Example 5.

Starting from an initial estimate of the normalized error variance (e.g. $\lfloor(\hat{\sigma}')^2\rfloor_0$=1), Equation 8 is recalculated repeatedly until the estimate converges. This process is guaranteed to converge to the maximum likelihood estimate of the normalized error variance, as it is a realization of the generalized Expectation-Maximization (EM) algorithm.

Each step of the EM algorithm averages over all possible "completions" of the data, in this case, all possible peptide identifications. As the algorithm converges to a stable estimate of the error, it also produces increasingly accurate probabilistic peptide identifications.

EXAMPLE 4

Calibration of Fourier-Transform Mass Spectra

A Two-Parameter Calibration from a Spectrum of Unknown Peptide

A set of frequencies ($f^{obs}_1$, $f^{obs}_2$, $f^{obs}_q$) corresponding to the cyclotron motion of the monoisotopic species of a peptide may be extracted from the spectrum. It is also assumed that the charges of the peptides may also be determined unambiguously from the sequence of frequencies of isotopically related species. Let $(z_1, z_2, \ldots z_q)$ denote the corresponding charges.

Let A and B denote undetermined calibration parameters in the following functional form relating observed frequencies to mass-over-charge ratio:

$$\left(\frac{m}{z}\right)^{obs} = A\frac{1}{f^{obs}} + B\frac{1}{(f^{obs})^2}$$

Solving for the mass, the related equation below is obtained:

$$m^{obs} = z\left(A\frac{1}{f^{obs}} + B\frac{1}{(f^{obs})^2}\right)$$

The calibration problem involves finding values A* and B* that minimize the estimated average squared (normalized) difference between the true value of the mass and the value calculated from the observed frequency, the charge, and the calibration parameters as in the above equation.

It will be shown that the values of A* and B* may be determined by solving two linear equations in two unknowns.

It is assumed that the possible exact mass values are given by {a1, a2, . . . ar}. The expected squared error is given in Equation 8 where bi is replaced by $m_i^{obs}$. In addition, the probabilities assigned to the exact mass values will be taken as fixed. As a shorthand notion, let $p_{ij}$ represent the quantity $p(\alpha_j | m_i^{obs}, (\hat{\sigma}')^2)$.

Equation 8 is re-written in this new notation.

$$\hat{\sigma}^2 = \frac{1}{q}\sum_{i=1}^{q}\sum_{j=1}^{r}\left(\frac{m_i^{obs} - \alpha_j}{10^{-6}\alpha_j}\right)^2 p_{ij}$$

Then, $m_i^{obs}$ is replaced with the calibration formula.

$$\hat{\sigma}^2 = \frac{1}{q}\sum_{i=1}^{q}\sum_{j=1}^{r}\left(\frac{z_i\left(A\frac{1}{f_i^{obs}} + B\frac{1}{(f_i^{obs})^2}\right) - \alpha_j}{10^{-6}\alpha_j}\right)^2 p_{ij}$$

Now both sides are differentiated with respect to each calibration parameter.

$$\frac{\partial(\hat{\sigma}^2)}{\partial A} = \frac{1}{q}\sum_{i=1}^{q}\sum_{j=1}^{r}\left(\frac{z_i\left(A\frac{1}{f_i^{obs}} + B\frac{1}{(f_i^{obs})^2}\right) - \alpha_j}{10^{-6}\alpha_j}\right)\left(\frac{z_i}{f_i^{obs}10^{-6}\alpha_j}\right)p_{ij}$$

$$\frac{\partial(\hat{\sigma}^2)}{\partial B} =$$

-continued $$\frac{1}{q}\sum_{i=1}^{q}\sum_{j=1}^{r}\left(\frac{z_i\left(A\frac{1}{f_i^{obs}} + B\frac{1}{(f_i^{obs})^2}\right) - \alpha_j}{10^{-6}\alpha_j}\right)\left(\frac{z_i}{(f_i^{obs})^2 10^{-6}\alpha_j}\right)p_{ij}$$

When the above derivatives are evaluated at (A*,B*), each is equal to zero, since (A*,B*) minimizes $\hat{\sigma}^2$.

$$\frac{A^*}{q}\sum_{i=1}^{q}\sum_{j=1}^{r}\left(\frac{z_i^2}{(f_i^{obs})^2}\right)\left(\frac{1}{(10^{-6}\alpha_j)^2}\right)p_{ij} + \frac{B^*}{q}\sum_{i=1}^{q}\sum_{j=1}^{r}\left(\frac{z_i^2}{(f_i^{obs})^3}\right)\left(\frac{1}{(10^{-6}\alpha_j)^2}\right)p_{ij} = \frac{1}{q}\sum_{i=1}^{q}\sum_{j=1}^{r}\left(\frac{\alpha_j}{(10^{-6}\alpha_j)^2}\right)\left(\frac{z_i}{f_i^{obs}}\right)p_{ij}$$

$$\frac{A^*}{q}\sum_{i=1}^{q}\sum_{j=1}^{r}\left(\frac{z_i^2}{(f_i^{obs})^3}\right)\left(\frac{1}{(10^{-6}\alpha_j)^2}\right)p_{ij} + \frac{B^*}{q}\sum_{i=1}^{q}\sum_{j=1}^{r}\left(\frac{z_i^2}{(f_i^{obs})^4}\right)\left(\frac{1}{(10^{-6}\alpha_j)^2}\right)p_{ij} = \frac{1}{q}\sum_{i=1}^{q}\sum_{j=1}^{r}\left(\frac{\alpha_j}{(10^{-6}\alpha_j)^2}\right)\left(\frac{z_i}{(f_i^{obs})^2}\right)p_{ij}$$

The two equations above are re-written as a single matrix equation.

$$\begin{bmatrix} \sum_{i=1}^{q}\frac{z_i^2}{(f_i^{obs})^2}\sum_{j=1}^{r}\frac{p_{ij}}{\alpha_j^2} & \sum_{i=1}^{q}\frac{z_i^2}{(f_i^{obs})^3}\sum_{j=1}^{r}\frac{p_{ij}}{\alpha_j^2} \\ \sum_{i=1}^{q}\frac{z_i^2}{(f_i^{obs})^3}\sum_{j=1}^{r}\frac{p_{ij}}{\alpha_j^2} & \sum_{i=1}^{q}\frac{z_i^2}{(f_i^{obs})^4}\sum_{j=1}^{r}\frac{p_{ij}}{\alpha_j^2} \end{bmatrix} \begin{bmatrix} A^* \\ B^* \end{bmatrix} = \begin{bmatrix} \sum_{i=1}^{q}\frac{z_i}{f_i^{obs}}\sum_{j=1}^{r}\frac{p_{ij}}{\alpha_j} \\ \sum_{i=1}^{q}\frac{z_i}{(f_i^{obs})^2}\sum_{j=1}^{r}\frac{p_{ij}}{\alpha_j} \end{bmatrix}$$

Finally, the optimal values of the calibration parameters may be solved.

$$\begin{bmatrix} A^* \\ B^* \end{bmatrix} = \begin{bmatrix} \sum_{i=1}^{q}\frac{z_i^2}{(f_i^{obs})^2}\sum_{j=1}^{r}\frac{p_{ij}}{\alpha_j^2} & \sum_{i=1}^{q}\frac{z_i^2}{(f_i^{obs})^3}\sum_{j=1}^{r}\frac{p_{ij}}{\alpha_j^2} \\ \sum_{i=1}^{q}\frac{z_i^2}{(f_i^{obs})^3}\sum_{j=1}^{r}\frac{p_{ij}}{\alpha_j^2} & \sum_{i=1}^{q}\frac{z_i^2}{(f_i^{obs})^4}\sum_{j=1}^{r}\frac{p_{ij}}{\alpha_j^2} \end{bmatrix}^{-1}$$

-continued $$\begin{bmatrix} \sum_{i=1}^{q} \frac{z_i}{f_i^{obs}} \sum_{j=1}^{r} \frac{p_{ij}}{\alpha_j} \\ \sum_{i=1}^{q} \frac{z_i}{(f_i^{obs})^2} \sum_{j=1}^{r} \frac{p_{ij}}{\alpha_j} \end{bmatrix}$$

After the new values A* and B* have been used to recalculate the observed masses, $m_i^{obs}$, the error estimate may be reduced. As a result, the probabilities assigned to the exact masses for each measurement $p_{ij}$ shift so that more weight is placed upon candidates that are close to the calculated mass value. The EM algorithm may be run again to simultaneously determine the overall error and the individual probabilities. After the probabilities are updated, the values of A* and B* that have just been calculated are no longer optimal and may be recalculated. This procedure of iterating calibration steps and applications of the EM algorithm to update the exact mass probabilities is repeated to convergence.

EXAMPLE 5

Derivation of the Update Step in the Application of the EM Algorithm

By definition of the EM algorithm, the estimate of the normalized error variance in step n+1, $\lfloor(\hat{\sigma}')^2\rfloor_{n+1}$, is the value that maximizes the function Q (the expectation) calculated from the estimate obtained in step n, $\lfloor(\hat{\sigma}')^2\rfloor_n$.

$$[(\hat{\sigma}')^2]_{n+1} = \underset{(\sigma')^2 \in R+}{\arg\max}\, Q((\sigma')^2 \mid [(\hat{\sigma}')^2]_n) \tag{9}$$

The function Q is defined as the expectation of the log-likelihood of the complete data given the undetermined normalized error variance, $(\sigma')^2$. The complete data is the set of observed measurements β plus the exact masses of the measured peptides, denoted by the mapping m. The possible completions of the data, the exact peptide masses, are considered to be drawn from the conditional distribution given the measurements β with the normalized error variance taken to be $\lfloor(\hat{\sigma}')^2\rfloor_n$.

$$Q((\sigma')^2 \mid [(\hat{\sigma}')^2]_n) = E[\log p(\beta, m \mid \alpha, (\sigma')^2) \mid \alpha, \beta, [(\hat{\sigma}')^2]_n] = \sum_{m\in[1 \ldots r]^q} \log p(\beta, m \mid \alpha, (\sigma')^2) \cdot p(m \mid \alpha, \beta, [(\hat{\sigma}')^2]_n) \tag{10}$$

The value of $(\sigma')^2$ that maximizes Q has zero first-derivative. The first derivative of Q is given by Equation 11.

$$\frac{\partial Q((\sigma')^2 \mid \lfloor(\hat{\sigma}')^2\rfloor_n)}{\partial(\sigma')^2} = \sum_{m\in[1 \ldots r]^q} \frac{\partial \log p(\beta, m \mid \alpha, (\sigma')^2)}{\partial(\sigma')^2} \cdot p(m \mid \alpha, \beta, [(\hat{\sigma}')^2]_n) \tag{11}$$

The probability of the complete data, which appears in the right hand side of Equation 11, can be expressed as a product of probabilities. These factors are expressed in terms of individual measurements in Equations 13 and 14.

$$p(\beta, m \mid \alpha, (\sigma')^2) = p(\beta \mid \alpha, (\sigma')^2, m)p(m) \tag{12}$$

$$p(\beta \mid \alpha, (\sigma')^2, m) = \prod_{i=1}^{q} p(\beta_i \mid \alpha_{m_i}, (\sigma')^2) \tag{13}$$

$$p(m) = \prod_{i=1}^{q} p(\alpha_{m_i}) \tag{14}$$

The log-likelihood of the complete data, which appears in the right-hand side of Equation 11, can be expressed as a sum of terms by combining equations 12, 13, and 14.

$$\log p(\beta, m \mid \alpha, (\sigma')^2) = \sum_{i=1}^{q} \log p(\beta_i \mid \alpha_{m_i}, (\sigma')^2) + \sum_{i=1}^{q} \log p(\alpha_{m_i}) = \frac{-1}{2(\sigma')^2} \sum_{i=1}^{q} \left(\frac{\beta_i - \alpha_{m_i}}{10^{-6}\alpha_{m_i}}\right)^2 - \frac{q}{2}\log((\sigma')^2) - \frac{q}{2}\log\left(2\pi(10^{-6}\alpha_{m_i})^2\right) + \sum_{i=1}^{q} \log p(\alpha_{m_i}) \tag{15}$$

The derivative of the log-likelihood of the complete data with respect to $(\sigma')^2$ is given in Equation 16.

$$\frac{\partial \log p(\beta, m \mid \alpha, (\sigma')^2)}{\partial(\sigma')^2} = \frac{1}{2[(\sigma')^2]^2} \sum_{i=1}^{q} \left(\frac{\beta_i - \alpha_{m_i}}{10^{-6}\alpha_{m_i}}\right)^2 - \frac{q}{2}\frac{1}{(\sigma')^2} \tag{16}$$

Then, the right-hand side of Equation 16 is plugged into Equation 10 to obtain the first derivative of Q.

$$\frac{\partial Q((\sigma')^2 \mid [(\hat{\sigma}')^2]_n)}{\partial(\sigma')^2} = \frac{1}{2[(\sigma')^2]^2} \sum_{m\in[1 \ldots r]^q} \sum_{i=1}^{q} \left(\frac{\beta_i - \alpha_{m_i}}{10^{-6}\alpha_{m_i}}\right)^2 p(m \mid \alpha, \beta, [(\hat{\sigma}')^2]_n) - \frac{q}{2(\sigma')^2} \tag{17}$$

To determine the value of $(\sigma')^2$ that maximized Q, the right-hand side of Equation 17 is set to zero and solve for $(\sigma')^2$. This value is the updated estimate of the normalized error variance.

$$[(\hat{\sigma}')^2]_{n+1} = \frac{1}{q} \sum_{m\in[1 \ldots r]^q} \sum_{i=1}^{q} \left(\frac{\beta_i - \alpha_{m_i}}{10^{-6}\alpha_{m_i}}\right)^2 p(m \mid \alpha, \beta, [(\hat{\sigma}')^2]_n) \tag{18}$$

The multi-dimensional sum in the right-hand side of Equation 18 can be simplified by virtue of the separability of $p(m|\alpha,\beta,[(\hat{\sigma}')^2]_n)$.

$$p(m\mid\alpha,\beta,[(\hat{\sigma}')^2]_n)=\prod_{i=1}^{q}p(\alpha_{m_i}\mid\beta_i,[(\hat{\sigma}')^2]_n) \tag{19}$$

Next, exchange the order of summation and expand the vector sum in the right-hand side of Equation 18 explicitly.

$$[(\hat{\sigma}')^2]_{n+1}=\frac{1}{q}\sum_{i=1}^{q}\sum_{m_i=1}^{r}p(\alpha_{m_1}\mid\beta_1,[(\hat{\sigma}')^2]_n)\sum_{m_2=1}^{r}p(\alpha_{m_2}\mid\beta_2,[(\hat{\sigma}')^2]_n)\ \ldots\sum_{m_q=1}^{r}p(\alpha_{m_q}\mid\beta_q,[(\hat{\sigma}')^2]_n)\left(\frac{\beta_i-\alpha_{m_i}}{10^{-6}\alpha_{m_i}}\right)^2 \tag{20}$$

Then, rearrange Equation 20, separating each term in the sum as a product of q terms.

$$[(\hat{\sigma}')^2]_{n+1}=\frac{1}{q}\sum_{i=1}^{q}\left(\sum_{m_i=1}^{r}p(\alpha_{m_1}\mid\beta_1,[(\hat{\sigma}')^2]_n)\left(\frac{\beta_i-\alpha_{m_i}}{10^{-6}\alpha_{m_i}}\right)^2\right)\cdot\prod_{k\neq i}\left(\sum_{m_k=1}^{r}p(\alpha_{m_k}\mid\beta_k,[(\hat{\sigma}')^2]_n)\right) \tag{21}$$

However, each term in the product indexed by k is the sum of disjoint probabilities and therefore unity. To obtain the form in Equation 8, the index on the inner sum is changed from $m_i$ to j.

$$[(\hat{\sigma}')^2]_{n+1}=\sum_{i=1}^{q}\sum_{j=1}^{r}\left(\frac{\beta_i-\alpha_j}{10^{-6}\alpha_j}\right)^2p(\alpha_j\mid\beta_i,[(\hat{\sigma}')^2]_n) \tag{22}$$

EXAMPLE 6

Use of a Spline Algorithm

A spline is a smooth function defined on some domain, consisting of a set of smooth segment functions defined on subdomains that form a partition of the original domain. A spline is formed by concatenation of the segment functions. To obtain a smooth spline, constraints are imposed upon the values of the segment functions and their derivatives at the subdomain boundaries. For a spline to be continuous and have n continuous derivatives requires n+1 constraints at each boundary point.

In data analysis, a model function that best fits the data is chosen from a family of related functions, each indexed by a vector of parameter values. When the parameters represent physical quantities, the model function represents an estimate of the state of a system from a set of measurements.

In some cases, a given physical model is a good description of a process only for disjoint local regions of a domain space. A family of functions can be extended to model a larger class of phenomenon by connecting them to form splines. The domain space (the independent variable) is partitioned into regions, each of which is characterized by its own local set of parameter values. The values of the spline parameters in a subdomain are guided by the measurement values from its own subdomain, but also coupled to the parameter values in other domains by virtue of the spline constraints.

Calibration in FTMS involves generalizing the relationship between the measured cyclotron frequency of an ion and its mass-to-charge ratio from a set of observed frequencies of ions of known mass-to-charge ratios. The form of the calibration function is based upon the magnetic and electrostatic forces encountered by ions in an analytic cell. There are a variety of different calibration functions, but the most widely used involves two parameters, A and B (Ledford, E. B. et al., Mass Calibration, Int J Mass Spectrom Ion Process 56: 2744-2748 (1984))

$$m/z=\frac{A}{f_{obs}}+\frac{B}{f_{obs}^2} \tag{23}$$

Because the motion of ions in an FTMS cell is not fully understood, the parameter values are semi-empirical. Parameter A corresponds to the centripetal magnetic force and the radial component of the electrostatic trapping force. Parameter B corresponds to the "space-charge effect".

The space-charge effect describes the electrostatic repulsion between analyte ions of different species, causing a net outward force, and a decrease in frequency. The value of parameter B has been shown to be roughly linear in the total number of ions in the analytic cell (Easterling M. L. et al., Anal Chem 71:624-632 (1999)). However, the space-charge effect is fundamentally a local rather than a global phenomenon, with ions influenced disproportionately more by ions of similar frequency. Therefore, the local spectral density of ions appears to affect the observed frequency. Local distortions in the calibration relation have been reported (Masselon C. et al., JASMS 13: 99-106 (2002)).

Spline parameters may be used to estimate the local variations in the calibration parameters with the ultimate goal of improving the accuracy of the estimated m/z values. The frequency domain is partitioned into regions. The choice of partition is driven by the data. Each subdomain has its own local values of calibration parameters A and B, and an additional parameter D, introduced for technical reasons. The first spline segments has three degree of freedom; each additional spline segment introduces three parameters; two of these are required to satisfy the spline constraints; the remaining degree of freedom can be used to fit the data.

The calibration relation between mass-to-charge-ratio and frequencies in the range $[f_{lo}, f_{hi})$ may be determined using a spline as the calibration relation. Let s denote a spline of N segments defined on this region. Let $P=(f_0, f_1, \ldots f_N)$ with $f_0=f_{lo}$. $f_N=f_{hi}$, and $f_i<f_j$ for i<j denote a partition of the range $[f_{lo},f_{hi})$. Let si for i in 1 . . . N denote the segment function defined on the subdomain $[f_{i-1},f_i)$. For notational convenience, let l(f) denote the subdomain that contains f.

$$I(f)=i\ i\epsilon[f_{i-1},f_i) \tag{24}$$

Let s(f) denote the value of the spline evaluated at f. This is defined as the value of segment function indexed by l(f) evaluated at f.

$$s(f)=s_{I(f)}(f) \tag{25}$$

Let $A_i$, $B_i$ denote the local calibration parameters in $[f_{i-1}, f_i)$, and let $D_i$ denote the local shift applied to this region in order to generate a globally smooth spline.

$$s_i(f) = \frac{A_i}{f} + \frac{B_i}{f^2} + D_i \quad f \in [f_{i-1}, f_i] \tag{26}$$

Combining Equations 25 and 26, the calibration relation generalized to splines is given by $$s(f) = \frac{A_{I(f)}}{f} + \frac{B_{I(f)}}{f^2} + D_{I(f)} \tag{27}$$

Let x denote the vector of 3N parameters, combining the three local parameters for each of the N spline segments.

$$x=[A_1B_1D_1 \ldots A_NB_ND_N]^T \tag{28}$$

Equation 27 may be written as a product of a row vector $r^T(f)$ and vector x.

$$s(f)=r^T(f)x \tag{29}$$

Row vector $r^T(f)$ has 3N columns, all but three of which are zero: columns 3l(f)−2, 3l(f)−1, and 3l(f) contain entries 1/f, 1/f2, and 1.

In general, the expression for column i of $r^T(f)$ can be expressed as follows:

$$r^T(f)(i) = \delta\left(3\left\lfloor\frac{i+2}{3}\right\rfloor, I(f)\right)f^{3\lfloor i/3\rfloor - i} \tag{30}$$

The 2(N−1) constraints on parameter vector x that must be satisfied for s to be a smooth spline can be represented by a matrix Equation.

$$Cx=0 \tag{31}$$

C denotes a constraint matrix of 2(N−1) rows, one for each constraint, and 3N columns, one for each parameter. For example, the constraint that the spline s be continuous at $f_1$, requires that the following condition holds:

$$s_1(f_1) = \frac{A_1}{f_1} + \frac{B_1}{f_1^2} + D_1 = s_2(f_1) = \frac{A_2}{f_1} + \frac{B_2}{f_1^2} + D_2 \tag{32a}$$

Equivalently, in matrix form, $$\left[\frac{1}{f_1} \;\; \frac{1}{f_1^2} \;\; 1 \;\; -\frac{1}{f_1} \;\; -\frac{1}{f_1^2} \;\; -1 \;\; 0 \;\; \ldots \;\; 0\right]x = 0 \tag{32b}$$

The constraint that the first derivative of s be continuous at $f_1$ requires $$\left.\frac{ds_1}{df}\right|_{f1} = \frac{-A_1}{f_1^2} - \frac{2B_1}{f_1^3} = \left.\frac{ds_2}{df}\right|_{f1} = \frac{-A_2}{f_1^2} - \frac{2B_2}{f_1^3} \tag{33a}$$

Equivalently, in matrix form, $$\left[\frac{1}{f_1^2} \;\; \frac{1}{f_1^3} \;\; 0 \;\; -\frac{1}{f_1^2} \;\; -\frac{1}{f_1^3} \;\; 0 \;\; 0 \;\; \ldots \;\; 0\right]x = 0 \tag{33b}$$

Let $C_1$ denote the banded diagonal matrix of N−1 continuity constraints, and $C_2$ denote the banded diagonal matrix of N−1 first-derivative constraints. Then, C is the matrix formed by stacking $C_1$ and $C_2$.

$$C = \begin{bmatrix} C_1 \\ C_2 \end{bmatrix} \tag{34}$$

The general entries (in row i column j) of $C_1$ and $C_2$ respectively are given below.

$$C_1(i, j) = \delta\left(3\left\lfloor\frac{i+2}{3}\right\rfloor, j\right)f_j^{3\lfloor i/3\rfloor - i} \tag{35a}$$

$$C_2(i, j) = \delta\left(3\left\lfloor\frac{i+2}{3}\right\rfloor, j\right)(3\lfloor i/3\rfloor - i)f_j^{3\lfloor i/3\rfloor - i - 1} \tag{35b}$$

Let f denote the vector whose components are the measured frequencies of K distinct ions.

$$f=[f^{obs}_1 \ldots f^{obs}_K]^T \tag{36}$$

Let m denote the vector that contains the corresponding (known) m/z values of these ions.

$$m=[m_1 \ldots m_K]^T \tag{37}$$

Let $m^{calc}$ denote the vector of values calculated from corresponding $f^{obs}$ using the vector of calibration parameters x and the calibration relation in Equation 27.

$$m^{calc}=[m^{calc}_1 \ldots m^{calc}_K]^T \tag{38a}$$

$$m^{calc}_i=S(f^{obs}_i) \tag{38b}$$

Let e denote the weighted squared error between the observed m/z values and the corresponding calculated values.

$$e = \sum_{k=1}^{K} w_k (m_k^{calc} - m_k)^2 \tag{39}$$

It may be assumed that the errors are normally distributed with the standard error proportional to the mass. Therefore, the weights are given by the inverse mass squared.

$$w_k = \frac{1}{m_k^2} \tag{40}$$

The goal is to find the parameter vector x that minimizes the e subject to the constraint Cx=0, i.e. the smooth calibration spline that best fits the observed data. Because the log-likelihood is equal to −e (plus some terms that can be ignored because they are independent of x), if x minimizes e it also maximizes the data likelihood.

Because the constraint is linear, the solution to the constrained optimization problem exists in closed form and can be found using the method of Lagrange multipliers.

To construct the solution, Equation 38 may be expressed in matrix form. First the vector $m^{calc}$ may be expressed in terms of a matrix Equation. To do so, matrix R may be constructed by stacking the row vectors defined by Equation 30 evaluated for each observed frequency.

$$R = \begin{bmatrix} r^T(f_1^{obs}) \\ \vdots \\ r^T(f_K^{obs}) \end{bmatrix} \quad (41)$$

Then, combining Equation 41 with Equations 29 and 38ab, the vector $m^{calc}$ is the product of matrix R and parameter vector x.

$$m^{calc}=Rx \quad (42)$$

Next, a diagonal matrix W is defined whose entries are the weights defined in Equation 40.

$$W(i,j)=\delta(i,j)w_j \quad (43)$$

Then, combining Equations 42 and 43 with Equation 39, a matrix expression for the squared error is obtained.

$$e=(Rx-m)^T W(Rx-m) \quad (44)$$

Let X* denote the value of x that minimizes e subject to the constraint Cx=0.

$$x^*=(R^TWR)^{-1}R^TWm-(R^TWR)^{-1}C^T[C(R^TWR)^{-1}C^T]^{-1}C(R^TWR)^{-1}R^TWm \quad (45)$$

This is the set of parameters that describe a maximum-likelihood spline relation between observed frequencies and m/z.

When calibration is performed on samples without analytes of known mass-to-charge ratio, the maximum likelihood vector of spline parameters can also be written in terms of Equation 45, except that the matrices W and R and the vector m must be modified.

When an ion mass is not known, its mass is characterized by a probability mass function. For example, suppose that the $m_k$ could be any of the following $n_k$ values $m_{k1}$, $m_{k2}$, . . . or $m_{knk}$. Suppose also that the probability that the true m/z value is equal to each of these values is $p_{k1}$, $p_{k2}$, . . . and $p_{knk}$ respectively. In the case of uncertain m/z values, the expectation of the squared error is minimized, where the error is taken to be a random variable.

$$e = \sum_{k=1}^{K}\sum_{i=1}^{n_k} p_{ki}w_k(m_k^{calc}-m_{ki})^2 \quad (46)$$

The term e may be written in matrix form by collapsing the double-sum in Equation 46 into a single sum. The vector m may be constructed as shown in Equation 37, except that each scalar known mass $m_k$ may be replaced with the vector of $n_k$ candidate mass values ($m_{k1}$, $m_{k2}$, . . . $m_{knk}$). Likewise, the vector $m^{calc}$ may be constructed as shown in Equation 38a, except that the each scalar calculated mass $m^{calc}{}_k$ may be replaced with a vector containing $n_k$ copies of $m^{calc}{}_k$. The diagonal matrix of weights, originally defined, by Equation 43, is similarly modified. In place of each scalar diagonal entry, a block-diagonal matrix is formed, with K blocks denoted by $W_k$.

$$W=\text{diag}(W_k) \quad (47)$$

The matrix Wk is itself a diagonal matrix with $n_k$ entries. Each weight is the product of the inverse mass squared and the candidate probability.

$$W_k(i,j)=\delta(i,j)p_{ki}w_k \quad (48)$$

EXAMPLE 7

Calibration Test with Simulated Data

Calibration of Tryptic Peptide Mixtures Does not Require Calibration Standards A simulation experiment was performed to validate a calibration program that used probabilistic peptide identifications rather than known calibrant masses. Peptide masses were selected randomly from a database of human proteome tryptic peptides. A set of ion cyclotron frequencies was calculated from the mass values assuming all peptides had +1 charge and using values for the calibration parameters that are typical for the LTQ-FT. Observed frequencies were simulated by adding random shifts to the calculated frequencies. Calibration errors were introduced by random shifts to the chosen calibration parameter values. For errors of typical size (e.g. 1 ppm), it was possible to recalibrate the spectra without using knowledge of the original mass values, but only that the peptides were randomly selected from the database. To allow discovery of modified peptides, a database of "typical" tryptic peptide chemical formulas was constructed. The database contains the most frequently occurring chemical formulas of fragments that would be generated by tryptic digest of random amino acid sequences.

The data simulation consisted of three parts: selection of peptide masses, conversion of masses to cyclotron frequencies, and introduction of random errors in the frequency values.

The spectrum was driven by the selection of peptide masses at random from a database that contains an in silico tryptic digest of the human proteome. The resulting digest produced 342,623 distinct mass values. Peptide masses were chosen uniformly at random from this list. The number of peptides in the spectrum was a variable parameter.

To ionize a peptide of neutral mass $m_N$, the charge z was chosen to be defined by Equation 49.

$$z=\lceil m_N/2000 \rceil \quad (49)$$

The mass of the ion $m_I$ is the neutral mass plus the mass of z protons. The mass of a proton $m_p$ is 1.007276 Da.

$$m_I=m_N+zm_p \quad (50)$$

The ideal cyclotron frequency depends upon the mass to charge ratio of the ion.

$$m_I/z=(m_N+zm_p)/z=m_N/z-m_p \quad (51)$$

Hereafter, m/z (dropping the subscript I) was used to denote the mass to charge ratio of the ion.

The choice for z placed an upper limit of (approximately) 2,000 on m/z, which is typical for FTMS data collection in proteomic experiments. Each m/z value was converted into an ideal cyclotron frequency. Typically, the calibration relation is defined in terms of the ideal cyclotron frequency for an ion.

For example, the common relation was used as shown in Equation 52.

$$m/z = \frac{A}{f} + \frac{B}{f^2} \quad (52)$$

Note that the second term in the right-hand side of Equation 49 is small compared with the first-term. In some calculations, like analysis of the effect of frequency measurement error upon the mass-to-charge ratio (see below), the following approximation was acceptable.

$$m/z \cong \frac{A}{f} \quad (53)$$

Equation 54 has two solutions.

$$f = \frac{A}{2(m/z)} \pm \frac{\sqrt{A^2 + 4B(m/z)}}{2(m/z)} \quad (54)$$

The smaller of the two frequencies is the magnetron frequency. The larger value was desired, the cyclotron frequency, which is slightly smaller than A/(m/z). The values for A and B of $1.075*10^8$ and $-3.455*10^8$ were chosen respectively. These values approximate typical values for the Thermo LTQ-FT. Using these calibration parameters, each m/z value was plugged into Equation 54 to generate an ideal cyclotron frequency. These values are referred to as $A_{true}$ and $B_{true}$. The values of $A_{true}$ and $B_{true}$ were not available to the calibration program that subsequently analyzed the simulated data. The ideal frequency generated from Equation 54 will be referred to as $f_{true}$.

A mean-zero Gaussian random variable was added to each cyclotron frequency to simulate additive measurement error, denoted by e in Equation 55. The resulting frequency was denoted by $f_{obs}$.

$$f_{obs} = f_{true} + e \quad (55)$$

The standard deviation of the random error e was set to be proportional to the true frequency.

$$\sigma_e = \frac{x}{10^6} f_{true} \quad (56)$$

The term x denoted the measurement error in parts-per-million (ppm). Note that a given ppm error in the frequency produces an approximately equivalent ppm error in mass, as can be derived by differentiating both sides of (53).

$$\frac{d(m/z)}{(m/z)} \cong \frac{df}{f} \quad (57)$$

The error in this approximation is insignificant for typical calibration parameters. The simulated data consisted of a set of "observed" cyclotron frequencies, generated as described above. The number of observed frequencies was a variable parameter, which was denoted by N. The performance of the algorithm depended upon N as described below.

In addition to the parameters controlling the data simulation, there were a number of parameters that controlled the algorithm. The most important of these was the initial estimates of the calibration parameters A and B. These initial estimates are denoted by $A_0$ and $B_0$ respectively. In practice, these parameters may be the last known calibration parameters for the machine—either the output of the algorithm on the previous scan or the result of calibration on a previous run, In testing the algorithm, the chosen values differed slightly from the true values of A and B described above to simulate realistic errors in calibration. Analysis may be helpful in determining how to appropriately miscalibrate spectra.

Consider the effect of errors in both A and B upon m/z by modifying Equation 52.

$$\Delta(m/z) = \frac{\Delta A}{f} + \frac{\Delta B}{f^2} \quad (58)$$

Setting Δ(m/z) to zero and solving for ΔB indicates that the calibration error will be equal to zero for some value of f. Let $f_0$ denote the value where the calibration error is zero.

$$\Delta B = -\Delta A(f_0) \quad (59)$$

Combining Equations 58 and 59, produces an Equation for the calibration error in m/z as a function of ΔA and $f_0$.

$$\Delta(m/z) = \frac{\Delta A}{f}\left[1 - \frac{f_0}{f}\right] \quad (60)$$

Combining Equation 60 with (53), produces an approximation for the normalized calibration error.

$$\frac{\Delta(m/z)}{(m/z)} \cong \frac{\Delta A}{A}\left[1 - \frac{f_0}{f}\right] \quad (61)$$

The root-mean-squared normalized calibration error in a spectrum with observed frequencies (f1 . . . fN) can be approximated from (61). Replacing the true frequencies with the observed frequencies should not significantly change our estimate.

$$\text{rms}\left[\frac{\Delta(m/z)}{(m/z)}\right] \cong \frac{\Delta A}{A}\sqrt{\sum_{i=1}^{N}\left[1 - \frac{f_0}{f_i}\right]^2} \quad (62)$$

The error is minimized when $f_0$ is chosen to be the reciprocal average of the reciprocal frequency. This value of $f_0$, denoted by $f_0^*$ in Equation 59, eliminates systematic calibration errors in a given spectrum.

$$f_0^* = \left(\frac{1}{N}\sum_{i=1}^{N}\frac{1}{f_i}\right)^{-1} \quad (63)$$

The first six parameters describe the generation of simulated data. The values of $A_{true}$ and $B_{true}$ are typical calibration parameters that have been have encountered when running the Thermo LTQ-FT. The values of $A_{init}$ and $B_{init}$ were chosen to introduce miscalibration. $A_{init}$ differed from $A_{true}$ by 2 ppm. From Equation 55, it was observed that introduced calibration errors bounded above by 2 ppm for large masses. The value of $B_{init}$ was chosen so that $f_0$ (Equation 55) would be near the center of the spectrum. This combination of $A_{0init}$ and $B_{0init}$ placed the zero point for the calibration at m/z ~2000.

The number of peaks was arbitrarily set to 50 to represent a typical mass spectrum. The algorithm may perform better given more peaks. The measurement error describes the normalized rms deviation between the true cyclotron frequency and the observed value.

The last three parameters governed the calibration algorithm. In the above example, the initial error estimate was intentionally chosen to be much larger than the actual error. The number of iterations for the error estimator and calibrator were chosen to be much larger than what is typically required for convergence.

Figure 5:
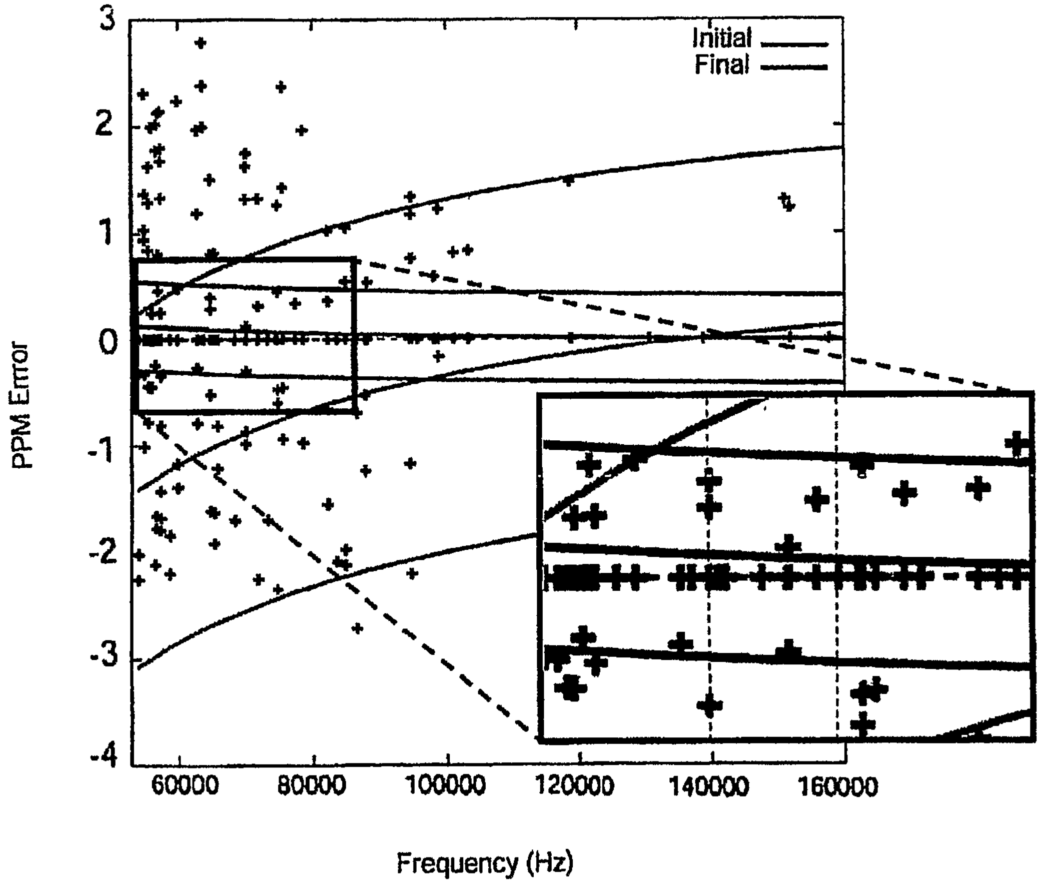
FIG. 5 shows the results of a calibration test in accordance with an embodiment of the present invention.

The algorithm proved to be robust to a variety of conditions. The data are shown in FIG. 5. In the high mass region inset of FIG. 5, the true masses lie on the x-axis. The first dashed vertical line denotes a low-confidence identification because several candidates are within $\pm 1\sigma$ of the true mass value. The second dotted line denotes a high-confidence identification because there is only one candidate within $\pm 1\sigma$ of the true mass value. There were no candidates in $\pm 1\sigma$. In summary, 50 random human tryptic peptides were analyzed (m=[0,2000], z=1).

The parameters characterizing the simulated data were the number of peptides in the spectrum and the measurement error. The performance of the calibration algorithm would be expected to increase with the number of peptides. This is because the initial convergence of the algorithm depends upon being able to unambiguously identify at least a small number of peptide masses. The probability that this condition is satisfied increases exponentially with the number of peptides in the spectrum. Similarly, the performance of the algorithm would be inversely correlated with the size of the measurement error. Large errors may make it difficult to identify peptide masses.

While the description above refers to particular embodiments of the present invention, it should be readily apparent to people of ordinary skill in the art that a number of modifications may be made without departing from the spirit thereof. The presently disclosed embodiments are, therefore, to be considered in all respects as illustrative and not restrictive.

What is claimed is:

1. A method of producing a calibrated mass spectrum, comprising:

a) providing a sample comprising two or more analytes;

b) subjecting the sample to mass spectrometry to obtain a mass spectrum, wherein the mass spectrum comprises un-calibrated data;

c) extracting the peaks from the spectrum and assigning a position and an ion charge to each peak;

d) providing input parameters comprising:

(i) initial estimates of calibration parameters wherein the calibration parameters relate the observed peaks in the mass spectrum to mass-to-charge ratio; and (ii) initial estimate of root-mean-squared error in the calibrated mass values;

e) providing a list of masses of analytes from a database to provide candidate analytes present in the sample, wherein a database comprises a list of elemental compositions and corresponding mass values;

f) converting each peak position determined in step (c) to an estimated mass-to-charge ratio using the input parameters;

g) calculating an estimated mass of the neutral analyte molecule from the mass-to-charge ratio estimate in step (f) and the ion charge determined in step (c);

h) assigning probabilities to one or more entries in the database as the identity of the analyte based on the estimate of the mass from step (g) and the estimate of root-mean-squared error;

i) updating the estimated values of the calibration parameters based on the assigned probabilities in step (h);

j) updating the estimated root-mean-squared error using the updated calibration parameters from step (i); and k) repeating steps f) through i) until convergence is reached, whereby a calibrated mass spectrum is produced and candidate identities are assigned to each peak in the spectrum.

2. The method of claim 1, wherein the input parameters further comprise, updated calibration parameters, an updated estimate of root-mean-squared or combinations thereof.

3. The method of claim 1, wherein the mass spectrometry is Fourier transform mass spectrometry.

4. The method of claim 1, wherein the mass spectrometry output comprises cyclotron frequencies.

5. The method of claim 1, wherein the elemental composition probabilities are peptide probabilities.

6. The method of claim 1, wherein the sample is selected from the group consisting of blood, plasma, serum, spinal fluid, urine, sweat, saliva, tears, breast aspirate, prostate fluid, seminal fluid, vaginal fluid, stool, cervical scraping, cytes, amniotic fluid, intraocular fluid, mucous, moisture in breath, animal tissue, cell lysates, tumor tissue, hair, skin, buccal scrapings, nails, bone marrow, cartilage, prions, bone powder, ear wax, and combinations thereof.

7. The method of claim 1, wherein the elemental composition comprises at least one peptide.

8. The method of claim 1, wherein the sample is selected from the group consisting of hydrocarbons, petroleum products, nucleotides, combinatorial samples, polymeric samples, and combinations thereof.

9. The method of claim 1, wherein the sample is a petroleum product.

10. The method of claim 1, wherein the estimating the root-mean-squared error and elemental composition probabilities comprises using an Expectation Maximization algorithm.

11. The method of claim 1, wherein the estimating the root-mean-squared error and elemental composition probabilities comprises using a spline algorithm.

12. A mass spectrometry calibration system, comprising:

A) a mass spectrometry device to analyze a sample and produce a mass spectrometry output, wherein said mass spectrometry output comprises un-calibrated data, and wherein the sample does not comprise a specific calibrant; and B) calibration software configured to:

i) receive input parameters, and wherein the input parameters comprise (a) initial estimates of calibration parameters wherein the calibration parameters relate the observed peaks in the mass spectrum to mass-to-charge ratio; and (b) initial estimate of root-mean-squared error in the calibrated mass values, ii) receive a list of exact masses of analytes from a database to provide candidate analytes present in the sample, wherein a database comprises a list of elemental compositions and corresponding mass values iii) convert each peak position to an estimated mass-to-charge ratio using the input parameters, iv) calculate an estimated mass of the neutral analyte molecule from the mass-to-charge ratio estimate and the ion charge, v) assign probabilities to one or more entries in the database as the identity of the analyte based on the estimate of the mass and the estimate of root-mean-squared error (vi) update the estimated values of the calibration parameters based on the assigned probabilities;

(vii) update the estimated root-mean-squared error using the updated calibration parameters; and vi) repeat steps iii) through vii) until convergence is reached, whereby a calibrated mass spectrum is produced and candidate identities are assigned to each peak in the spectrum.

13. The system of claim 12, wherein the input parameters are selected from the group consisting of initial calibration parameters, an initial root-mean-squared error estimate, updated calibration parameters, an updated root-mean-squared error estimate, and combinations thereof.

14. The system of claim 12, wherein the mass spectrometry device is a Fourier transform mass spectrometer.

15. The system of claim 12, wherein the mass spectrometry output comprises cyclotron frequencies.

16. The system of claim 12, wherein the elemental composition probabilities are peptide probabilities.

17. The system of claim 12, wherein the sample is selected from the group consisting of blood, plasma, serum, spinal fluid, urine, sweat, saliva, tears, breast aspirate, prostate fluid, seminal fluid, vaginal fluid, stool, cervical scraping, cytes, amniotic fluid, intraocular fluid, mucous, moisture in breath, animal tissue, cell lysates, tumor tissue, hair, skin, buccal scrapings, nails, bone marrow, cartilage, prions, bone powder, ear wax, and combinations thereof.

18. The system of claim 12, wherein the sample comprises at least one peptide.

19. The system of claim 12, wherein the sample is selected from the group consisting of hydrocarbon ns, petroleum products, nucleotides, combinatorial samples, polymeric samples, and combinations thereof.

20. The system of claim 12, wherein the sample is a petroleum product.

21. The system of claim 12, wherein the software is configured to estimate the root-mean-squared error and the elemental composition probabilities using an Expectation Maximization algorithm.

22. The system of claim 12, wherein the software is configured to estimate the root-mean-squared error and the elemental composition probabilities using a spline algorithm.

23. A computer-readable medium having computer-executable instructions that when executed perform a method, the method comprising:

a) converting a mass spectrum comprising un-calibrated data to mass values using input parameters, b) extracting the peaks from the spectrum and assigning a position and an ion charge to each peak;

c) providing input parameters comprising:

(i) initial estimates of calibration parameters wherein the calibration parameters relate the observed peaks in the mass spectrum to mass-to-charge ratio; and (ii) initial estimate of root-mean-squared error in the calibrated mass values;

d) providing a list of exact masses of analytes from a database to provide candidate analytes present in the sample, wherein a database comprises a list of elemental compositions and corresponding mass values;

e) converting each peak position determined in step (b) to an estimated mass-to-charge ratio using the input parameters;

f) calculating an estimated mass of the neutral analyte molecule from the mass-to-charge ratio estimate in step (e) and the ion charge determined in step (b);

g) assigning probabilities to one or more entries in the database as the identity of the analyte based on the estimate of the mass from step (f) and the estimate of root-mean-squared error;

h) updating the estimated values of the calibration parameters based on the assigned probabilities in step (g);

i) updating the estimated root-mean-squared error using the updated calibration parameters from step (h); and j) repeating steps e) through i) until convergence is reached, whereby a calibrated mass spectrum is produced and candidate identities are assigned to each peak in the spectrum.

24. The computer-readable medium of claim 23, wherein the input parameters are selected from the group consisting of initial calibration parameters, an initial root-mean-squared error estimate, and combinations thereof.

25. The computer-readable medium of claim 23, wherein the estimating the root-mean-squared error and the elemental composition probabilities uses an Expectation Maximization algorithm.

26. The computer-readable medium of claim 23, wherein the estimating the root-mean-squared error and the elemental composition probabilities uses a spline algorithm.

27. The computer-readable medium of claim 23, wherein the mass spectrometry output is produced by a Fourier transform mass spectrometer.

28. The computer-readable medium of claim 23, wherein the mass spectrometry output comprises cyclotron frequencies.

29. The computer-readable medium of claim 23, wherein the elemental composition probabilities are peptide probabilities.

* * * * *